United States Patent
Kwon et al.

(10) Patent No.: US 9,922,260 B2
(45) Date of Patent: Mar. 20, 2018

(54) SCRAPPED INFORMATION PROVIDING METHOD AND APPARATUS

(71) Applicant: Samsung Electronics Co., Ltd., Suwon-si, Gyeonggi-do (KR)

(72) Inventors: Bang Hyun Kwon, Gumi-si (KR); Keun Soo Kim, Gumi-si (KR); Jae Ho Lee, Daegu (KR); Chong Hoon Lee, Gumi-si (KR); Hyun Woong Kwon, Daegu (KR); Soon Sang Park, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 14/839,071

(22) Filed: Aug. 28, 2015

(65) Prior Publication Data

US 2016/0063339 A1  Mar. 3, 2016

(30) Foreign Application Priority Data

Aug. 29, 2014 (KR) ........................ 10-2014-0114104

(51) Int. Cl.
| | |
|---|---|
| G06K 9/62 | (2006.01) |
| G06K 9/20 | (2006.01) |
| G06F 3/0488 | (2013.01) |
| G06F 3/0484 | (2013.01) |
| G06F 3/0481 | (2013.01) |
| G06K 9/72 | (2006.01) |

(52) U.S. Cl.
CPC ....... *G06K 9/2081* (2013.01); *G06F 3/04817* (2013.01); *G06F 3/04842* (2013.01); *G06F 3/04883* (2013.01); *G06K 9/72* (2013.01)

(58) Field of Classification Search
None
See application file for complete search history.

(56) References Cited

U.S. PATENT DOCUMENTS

| | | | |
|---|---|---|---|
| 7,703,036 B2 | 4/2010 | Satterfield et al. | |
| 7,899,829 B1 | 3/2011 | Malla | |
| 8,321,802 B2 | 11/2012 | Rogers | |
| 9,058,092 B2 | 6/2015 | Rogers | |
| 2006/0036964 A1 | 2/2006 | Satterfield et al. | |
| 2008/0226119 A1* | 9/2008 | Candelore ......... | G06F 17/30256 382/100 |
| 2009/0279781 A1* | 11/2009 | Kitabatake ......... | G06K 9/00456 382/176 |
| 2010/0053342 A1 | 3/2010 | Hwang et al. | |
| 2010/0122194 A1 | 5/2010 | Rogers | |

(Continued)

FOREIGN PATENT DOCUMENTS

| | | |
|---|---|---|
| EP | 2 538 650 A1 | 12/2012 |
| KR | 10-2006-0046735 A | 5/2006 |

(Continued)

*Primary Examiner* — Brian P Werner
(74) *Attorney, Agent, or Firm* — Jefferson IP Law, LLP

(57) ABSTRACT

An information providing method of an electronic device is provided. The information providing method includes determining a selected area based on a user input, determining an extraction method based on types of one or more objects included in the selected area, extracting information from the selected area according to the determined extraction method, and performing a specific function based on the information.

19 Claims, 16 Drawing Sheets

(56) References Cited

U.S. PATENT DOCUMENTS

| | | |
|---|---|---|
| 2010/0180226 A1 | 7/2010 | Satterfield et al. |
| 2011/0022609 A1 | 1/2011 | Grover |
| 2012/0242473 A1* | 9/2012 | Choi ............... B60W 50/14 340/441 |
| 2012/0300244 A1* | 11/2012 | Kim ............... G06F 3/1204 358/1.13 |
| 2012/0306772 A1 | 12/2012 | Tan et al. |
| 2012/0327484 A1 | 12/2012 | Lee et al. |
| 2013/0014048 A1 | 1/2013 | Satterfield et al. |
| 2013/0019182 A1 | 1/2013 | Gil et al. |
| 2013/0067377 A1 | 3/2013 | Rogers |
| 2013/0117161 A1 | 5/2013 | Waidmann et al. |
| 2013/0335356 A1 | 12/2013 | Lee et al. |
| 2014/0019896 A1 | 1/2014 | Satterfield et al. |
| 2014/0019905 A1 | 1/2014 | Kim et al. |
| 2014/0055398 A1* | 2/2014 | Myung ............... G06F 3/041 345/173 |
| 2014/0056522 A1 | 2/2014 | Kim et al. |
| 2014/0062962 A1 | 3/2014 | Jang et al. |
| 2014/0068509 A1 | 3/2014 | Kadishay et al. |

FOREIGN PATENT DOCUMENTS

| | | |
|---|---|---|
| KR | 10-2013-0116148 A | 10/2013 |
| KR | 10-2014-0048934 A | 4/2014 |
| WO | 2012/162895 A1 | 12/2012 |

\* cited by examiner

SCRAPPED INFORMATION PROVIDING METHOD AND APPARATUS

CROSS-REFERENCE TO RELATED APPLICATION(S)

This application claims the benefit under 35 U.S.C. § 119(a) of a Korean patent application filed on Aug. 29, 2014 in the Korean Intellectual Property Office and assigned serial number 10-2014-0114104, the entire disclosure of which is hereby incorporated by reference.

TECHNICAL FIELD

The present disclosure relates to a technology for enabling a user to select an item or an object from content displayed on a screen of an electronic device and to use the selected item or object.

BACKGROUND

Existing electronic devices such as smartphones may support a function of selecting an item, such as text, from content displayed at the electronic device. For example, when a user identifies an arbitrary portion of text displayed on the display of the electronic device, the text or a character string including the text may be selected. For example, when an input associated with the arbitrary portion of text is received at the electronic device, the arbitrary portion of text or a character string including the arbitrary portion of text may be visually identified at the electronic device. In addition, the user may control a selection range associated with an identified portion of text or an object or the user may select an appropriate edit menu.

Furthermore, existing electronic devices may support a function of selecting an item such as an image. For example, when a user identifies an arbitrary image displayed on the display of the electronic device, the image may be selected.

However, the ability to select text in existing electronic devices is limited. For example, both a received message and a currently input message within a short message service (SMS) interface may not be simultaneously selected. For example, only text provided in an input field of the SMS interface may be capable of being selected. Furthermore, after text is selected, only an operation corresponding to an edit option (e.g., cut, copy, paste, delete, or the like) may be supported. Moreover, text embedded within an image is unable to be individually selected.

Other operation functions, such as a scrap function, may provide for capturing, storing, and/or managing a part or the entirety of content displayed on a screen. However, while the scrap function may enable selection of both text and an image included within the content, it does not support a function of extracting text embedded within a selected area of an image.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a technology for allowing a user to select a portion of content from the entire area of a screen of an electronic device, recognizing text and/or a non-text item (e.g. an image, a camera preview, or the like) included in an area associated with the portion of selected content, and extracting and/or analyzing any type of a text included in the selected area so as to provide an analysis result and various operations related thereto.

In accordance with an aspect of the present disclosure, an information providing method of an electronic device is provided. The information providing method includes determining a selected area based on a user input, determining an extraction method based on the types of one or more objects included in the selected area, extracting information from the selected area according to the determined extraction method, and performing a specific function based on the information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
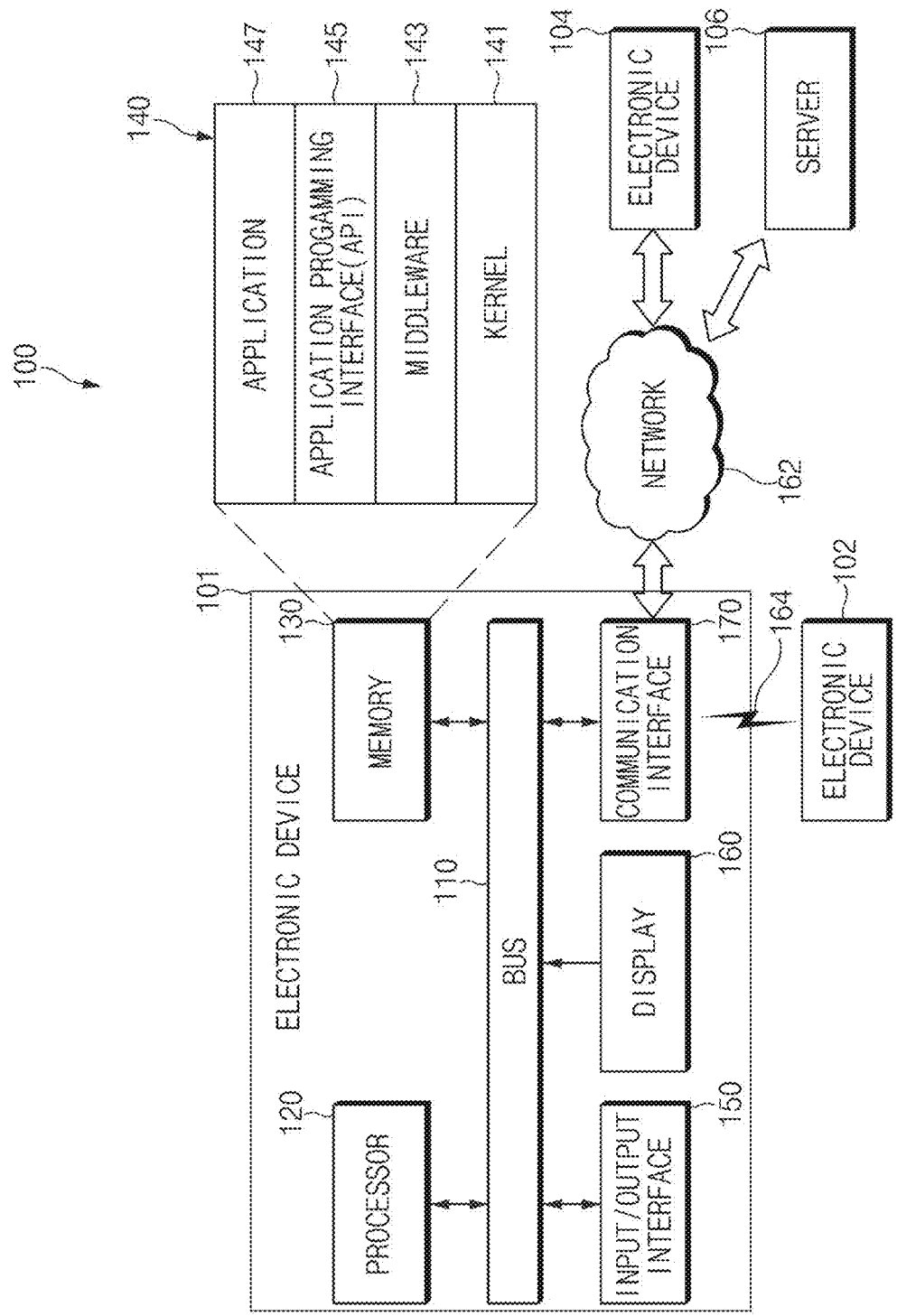
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "have", "may have", "include", "may include" or "comprise" used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second" or the like used herein may modify various elements regardless of order and/or priority, but does not limit the elements. Such terms may be used to distinguish one element from another element. For example, "a first user device" and "a second user device" may indicate different user devices regardless of order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a central processing unit (CPU) or an application processor (AP)) for executing at least one software program stored in a memory device to perform a corresponding operation.

The terminology used herein is not for delimiting the present disclosure but for describing specific various embodiments. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) audio layer 3 (MP3) player, a mobile medical device, a camera, or a wearable device (e.g., smartglasses, a head-mounted device (HMD), an electronic apparel, an electronic bracelet, an electronic necklace, an electronic appcessory, an electronic tattoo, a smart mirror, or a smartwatch).

In various embodiments of the present disclosure, an electronic device may be a smart home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., SAMSUNG HOMESYNC, APPLE TV, or GOOGLE TV), a game console (e.g., XBOX or PLAYSTATION), an electronic dictionary, an electronic key, a camcorder, or an electronic picture frame.

In various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global positioning system (GPS) receiver, an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device such as at a store or retailer, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). In various embodiments of the present disclosure, an electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 illustrates an electronic device in a network environment according to various embodiments of the present disclosure.

An electronic device 101 in a network environment 100 according to various embodiments of the present disclosure will be described with reference to FIG. 1.

Referring to FIG. 1, the electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a CPU, an AP, or a communication processor (CP). The processor 120 may perform data processing or an operation for communication and/or control of at least one of the other elements of the electronic device 101.

The processor 120 may include a module for performing various functions. For example, the processor 120 may include a control module for controlling overall operation of the electronic device 101 and performing a specific function. Furthermore, in an exemplary embodiment, the processor 120 may include an area determination module for determining a selection area based on an input received at the display 160. Various examples of determining an area according to an input will be described later with reference to FIG. 4.

Furthermore, the processor 120 may include a parsing module (e.g., a Hermes parsing engine) for extracting information from the selection area and analyzing the information. The parsing module may be construed as an analysis module or an extraction module. The processor 120 may further include an optical character recognition (OCR) module that is a slave to or parallel to the parsing module. Operation of the parsing module will be described with reference to FIGS. 6 and 7.

The memory device 130 may include a volatile memory and/or a nonvolatile memory. The memory 130 may store an instruction or data related to at least one of the other elements of the electronic device 101. According to an embodiment of the present disclosure, the memory 130 may store software and/or a program 140. The program 140 may include, for example, a kernel 141, middleware 143, an application programming interface (API) 145, and/or an application program (or an application) 147. At least a portion of the kernel 141, the middleware 143, or the API 145 may be referred to as an operating system (OS). Although not shown, a buffer memory may be included in the memory 130.

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 so as to control or manage the system resources.

The middleware 143 may serve as an intermediary between the API 145 or the application program 147 and the kernel 141 so that the API 145 or the application program 147 communicates and exchanges data with the kernel 141. Furthermore, the middleware 143 may perform a control operation (e.g., scheduling or load balancing) with respect to operation requests received from the application 147 by using, e.g., a method of assigning a priority for using system resources (e.g., the bus 110, the processor 120, the memory 130, or the like) of the electronic device 101 to at least one application of the application program 147.

The API 145, which is an interface for allowing the application program 147 to control a function provided by the kernel 141 or the middleware 143, may include at least one interface or function (e.g., an instruction) for file control, window control, image processing, character control, or the like.

The input/output interface 150 may serve to transfer an instruction or data input from a user or another external device to (an)other element(s) of the electronic device 101. Furthermore, the input/output interface 150 may output an instruction or data received from (an)other element(s) of the electronic device 101 to the user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may show various content (e.g., text, an image, a video, an icon, a symbol, or the like) to the user. The display 160 may include a touchscreen, and may receive a touch, gesture, proximity or hovering input from an electronic pen or a part of a body of the user.

The communication interface 170 may provide communication between the electronic device 101 and an external electronic device (e.g., a first external electronic device 102, a second external electronic device 104, or a server 106). For example, the communication interface 170 may be configured to connect to a network 162 so as to establish communications over the network 162. In an exemplary embodiment, electronic device 101 may communicate with the external electronic device (e.g., the second external electronic device 104 or the server 106) over the network 162.

The communication interface 170 may also be configured to establish wireless communication using short-range communication 164. The short-range communication 164 may include at least one of, for example, Wi-Fi, Bluetooth, near field communication (NFC), and global navigation satellite system (GNSS). The GNSS may include at least one of, for example, a GPS, a global navigation satellite system (GLONASS), a BeiDou navigation satellite system (BeiDou), and Galileo (European global satellite-based navigation system). Hereinafter, in the present disclosure, the "GPS" may be interchangeably used with the "GNSS".

Network 162 may be a wired or wireless communication network. For example, network 162 may support at least one of cellular communication protocols such as long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like for wireless communication. A technology for wired communication may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., a local area network (LAN) or wide area network (WAN)), the Internet, a telephone network, etc.

The first and second external electronic devices 102 and 104 may be the same as or different from the type of the electronic device 101. According to an embodiment of the present disclosure, the server device 106 may include a group of one or more servers. According to various embodiments of the present disclosure, a portion or all of operations performed in the electronic device 101 may be performed in one or more other electronic devices (e.g., the first or second external electronic device 102 or 104 or the server 106). According to an embodiment of the present disclosure, in the case where the electronic device 101 should perform a certain function or service automatically or in response to a request, the electronic device 101 may request at least a portion of functions related to the function or service from another device (e.g., the first or second external electronic device 102 or 104 or the server 106) instead of or in addition to performing the function or service for itself. The other electronic device (e.g., the first or second external electronic device 102 or 104 or the server 106) may perform the requested function or additional function, and may transfer a result of the performance to the electronic device 101. The electronic device 101 may use or additionally process the received result to provide the requested function or service. To this end, for example, a cloud computing technology, a distributed computing technology, or a client-server computing technology may be used.

The electronic device 101 may further include various elements not illustrated in FIG. 1 such as a photographing module (e.g., a camera). Examples of the various elements that may be additionally added to the electronic device 101 will be described later with reference to FIG. 16.

Figure 2:
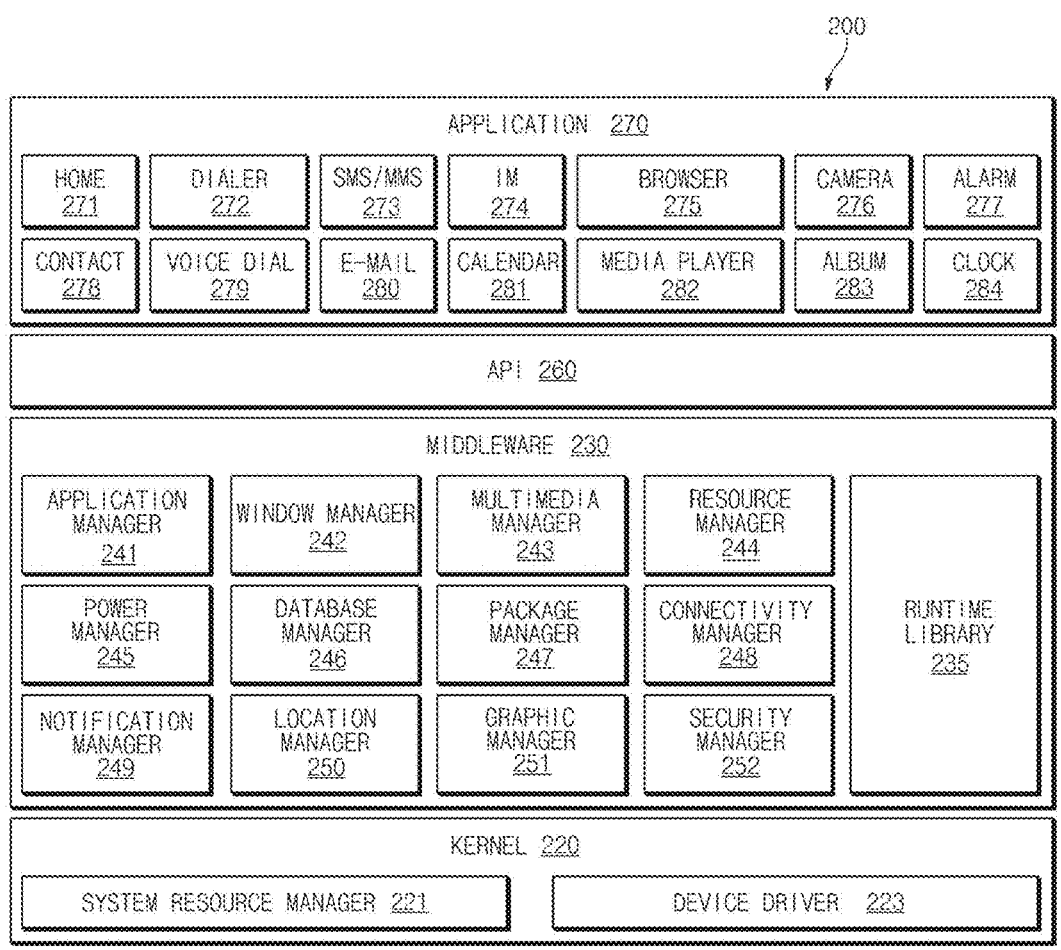
FIG. 2 is a block diagram illustrating a program module according to various embodiments of the present disclosure.

FIG. 2 is a block diagram of a program module 200 according to various embodiments of the present disclosure.

Referring to FIG. 2, according to an embodiment of the present disclosure, the program module 200 (for example, the program 140) may include an OS for controlling a resource related to an electronic device (e.g., the electronic device 101) and/or various applications (e.g., the application program 147) running on the OS. The OS may be, for example, ANDROID, IOS, WINDOWS, SYMBIAN, TIZEN, BADA, or the like.

The program module 200 may include a kernel 220, middleware 230, an API 260, and/or an application 270. At least a part of the program module 200 may be preloaded on an electronic device (e.g., electronic device 101, 102, 104) or may be downloaded from a server (e.g., the server 106).

The kernel 220 (e.g., the kernel 141 of FIG. 1) may include, for example, a system resource manager 221 and/or a device driver 223. The system resource manager 221 may perform control, allocation, and/or retrieval of a system resource. According to an embodiment of the present disclosure, the system resource manager 221 may include a process management unit, a memory management unit, a file system management unit, or the like. The device driver 223 may include, for example, a display driver, a camera driver, a BLUETOOTH (BT) driver, a shared memory driver, a USB driver, a keypad driver, a Wi-Fi driver, an audio driver, or an inter-process communication (IPC) driver.

The middleware 230, for example, may provide a function that the application 270 requires in common, or may provide various functions to the application 270 through the API 260 in order to allow the application 270 to efficiently use a limited system resource inside the electronic device. According to an embodiment of the present disclosure, the middleware 230 (e.g., the middleware 143) may include at least one of a runtime library 235, an application manager 241, a window manager 242, a multimedia manager 243, a resource manager 244, a power manager 245, a database (DB) manager 246, a package manager 247, a connectivity manager 248, a notification manager 249, a location manager 250, a graphic manager 251, or a security manager 252.

The runtime library 235 may include, for example, a library module that a complier uses to add a new function through a programming language while the application 270 is running. The runtime library 235 may perform a function for input/output management, memory management, or an arithmetic function.

The application manager 241 may mange, for example, a life cycle of at least one of the applications 270. The window manager 242 may manage a graphical user interface (GUI) resource used in a screen. The multimedia manager 243 may recognize a format required for playing various media files and may encode or decode a media file using a codec matched to the format. The resource manager 244 may manage a resource such as a source code, a memory, or a storage space of at least one of the applications 270.

The power manager 245, for example, may operate together with a basic input/output system (BIOS) to manage a battery or power and may provide power information required for operating the electronic device. The DB manager 246 may generate, search, and/or modify a DB to be used in at least one of the applications 270. The package manager 247 may manage installation or update of an application distributed in a package file format.

The connectivity manger 248 may manage wireless connection of Wi-Fi, BT, or the like. The notification manager 249 may display or notify an event such as message arrival, appointments, and proximity alerts in such a manner as not to disturb a user. The location manager 250 may manage location information of the electronic device. The graphic manager 251 may manage a graphic effect to be provided to a user or a user interface related thereto. The security manager 252 may provide various security functions required for system security or user authentication. According to an embodiment of the present disclosure, in the case where an electronic device (e.g., the electronic device 101) includes a phone function, the middleware 230 may further include a telephony manager for managing a voice or video call function of the electronic device.

The middleware 230 may include a middleware module for forming a combination of various functions of the above-mentioned elements. The middleware 230 may provide a module specialized for each type of an OS to provide differentiated functions. Furthermore, the middleware 230 may delete a part of existing elements or may add new elements dynamically. For example, the middleware 230 may include a view manager. The view manager may manage objects displayed on a screen of the electronic device. For example, the view manager may manage and obtain coordinate information of the objects displayed on the screen.

The API 260 (e.g., the API 145) which is, for example, a set of API programming functions may be provided in different configurations according to an OS. For example, in the case of ANDROID or IOS, one API set may be provided for each platform, and, in the case of TIZEN, at least two API sets may be provided for each platform.

The application 270 (e.g., the application program 147), for example, may include at least one application for providing functions, such as a home 271, a dialer 272, a short message system (SMS)/multimedia message system (MMS) 273, an instant message (IM) 274, a browser 275, a camera 276, an alarm 277, a contact 278, a voice dial 279, an e-mail 280, a calendar 281, a media player 282, an album 283, a clock 284. Application 270 may further include other applications not illustrated in FIG. 2 such as a health care application (e.g., measure an exercise amount or blood sugar), or environmental information provision application (e.g., provide air pressure, humidity, or temperature information).

According to an embodiment of the present disclosure, the application 270 may include an application (hereinafter referred to as "information exchange application") for supporting information exchange between the electronic device (e.g., the electronic device 101) and an external electronic device (e.g., the first or second external electronic device 102 or 104). The information exchange application may include, for example, a notification relay application for relaying specific information to the external electronic device or a device management application for managing the external electronic device.

For example, the notification relay application may have a function for relaying, to an external electronic device (e.g., the electronic device 102 or 104), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user. The device management application, for example, may manage (e.g., install, delete, or update) at least one function (e.g., turn-on/turn off of the external electronic device itself (or some elements) or the brightness (or resolution) adjustment of a display) of the external electronic device (e.g., the electronic device 104) communicating with the electronic device, an application operating in the external electronic device, or a service (e.g., call service or message service) provided from the external electronic device.

According to an embodiment of the present disclosure, the application 270 may include a specified application (e.g., a health care application) according to an attribute (e.g., the type of an electronic device is a mobile medical device) of the external electronic device (e.g., the electronic device 102 or 104). According to an embodiment of the present disclosure, the application 270 may include an application received from an external electronic device (e.g., the server 106 or the electronic device 102 or 104). According to an embodiment of the present disclosure, the application 270 may include a preloaded application or a third-party application downloadable from a server. The names of elements in the program module 200 illustrated may vary with the type of an OS.

According to various embodiments of the present disclosure, at least a part of the program module 200 may be implemented with software, firmware, hardware, or a combination thereof. At least a part of the programming module 200, for example, may be implemented (e.g., executed) by a processor (e.g., the AP 120). At least a part of the programming module 200 may include, for example, a module, a program, a routine, sets of instructions, and/or a process for performing at least one function.

Figure 3:
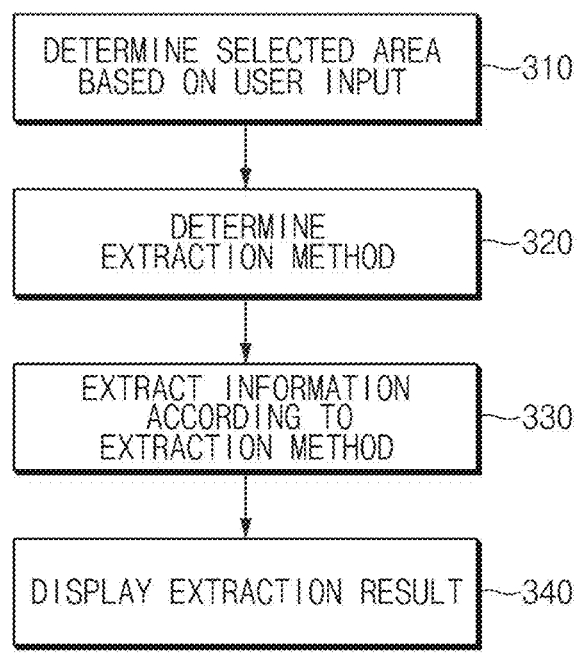
FIG. 3 is a block diagram illustrating a program module according to various embodiments of the present disclosure.

FIG. 3 illustrates a method for extracting information from a selection area and providing the information according to various embodiments of the present disclosure.

Referring to FIG. 3, in operation 310, an electronic device (e.g., the electronic device 101) may determine a selection area based on a user input. For example, the electronic device may determine a certain selection area based on an input provided at a display (e.g., the display 160) of the electronic device by a user using an input device such as a finger to create a touch input, an electronic pen, a stylus (e.g. S-pen), etc. A pen-type input device such as an electronic pen or a stylus may be referred to as a "pen" below. Operation 310 may be performed by an area determination module (e.g., a scrapbooker) of the electronic device. For example, in a service for monitoring a gesture of a pen (e.g., a service operating on an ANDROID OS), an area event may be transferred to a window corresponding to an area selected by the user. This event may be transferred to a view such that text or an image corresponding to the selected area may be obtained. Specific examples related to this operation will be described with reference to FIG. 4. Furthermore, a structure of the view will be described with reference to FIG. 5.

In operation 310, user input may select one or more areas of the display of the electronic device. For example, in the case where the display is divided into a content area and a text area, the user may select both the areas at once. Furthermore, even though the display is divided into a multi window, a floating window, or the like, an area including portions of different-attribute windows may be selected. In various embodiments of the present disclosure, in the case where the user performs selection using a(n) (electronic) pen, the electronic device may be automatically switched to an area selection state (e.g. a selection mode). Alternatively, the electronic device may be switched to the area selection state through an operation of the pen such as an air command or the like. The user may select currently displayed content with ease using the pen.

In various embodiments of the present disclosure, user input may be performed through a touch input. For example, the user may switch the electronic device into the area selection state using a menu button, a toggle button, or the like. When the electronic device is switched into the area selection state, an operation such as screen magnification, reduction, and/or execution of an application/link by a touch input of the user may be limited, and the touch input of the user may be treated as an input for determining a selection area. In various embodiments of the present disclosure, in the case where the electronic device has two displays functionally divided (e.g., a flat main display and a curved sub display extending from one side of the main display), when a specific icon is selected from one display (e.g., the sub display), the other display (e.g., the main display) may be switched into the area selection state.

In various embodiments of the present disclosure, when user input is complete, the electronic device may release the area selection state. For example, when the touch input of the user is finished after the electronic device enters the area selection state, the electronic device may release the area selection state, and perform a normal operation such as text selection, magnification, reduction or the like in response to a user input received after the release of the area selection state.

In operation 320, the electronic device may determine an extraction method based on the type of object included in the selection area. The extraction method may include, for example, a text extraction method and/or an image analysis (extraction) method. In various embodiments of the present disclosure, in the case where a text-type object is included in the selection area, the electronic device may extract text from the object using the text extraction method. In this case, the electronic device may ignore a non-text-type object included in the selection area. However, in various embodiments of the present disclosure, in the case where a non-text-type object is included in the selection area, the electronic device may use both the text extraction method and the image analysis method. In various embodiments of the present disclosure, the electronic device may be configured such that both the text extraction method and the image analysis method are used automatically when the selection area is determined.

In operation 330, the electronic device may extract text from the selection area according to the extraction method determined in operation 320, and may analyze the extracted text. For example, the electronic device may extract text information of each object using the text extraction method. Furthermore, the electronic device may extract the text information from an image included in the selection area using the image analysis method.

In the case where the text extraction method and the image analysis method are used together, an OCR technique may be used to recognize text included in an image. In this case, respective results extracted using the methods are compared to each other and an analysis result of the image analysis method which overlaps with an extraction result of the text extraction method is excluded to avoid redundancy.

In various embodiments of the present disclosure, when text information is extracted, the electronic device may perform analysis using the extracted text information. The electronic device may use various analysis methods. For example, the electronic device may determine whether the extracted text information is meaningful information using a text token (e.g., Hermes service token). Furthermore, the electronic device may perform analysis on the extracted text information using a DB that is locally located in the electronic device or is located in a remote server.

In various embodiments of the present disclosure, the electronic device may add to an analysis result a result of a search performed using the text information as a keyword. For example, in the case of a keyword related to a place, geographical information (e.g., a map) including the place may be added to the analysis result. For example, in the case of a keyword related to a shop name, a telephone number of a corresponding shop or franchisee may be added to the analysis result. For example, in the case of a keyword related to weather or stocks, a weather forecast or a current stock price may be added to the analysis result.

In operation 340, the electronic device may display the analysis result. The electronic device may display an icon indicating the analysis result on one portion (e.g., a right upper end, or the like) of the display of the electronic device. In various embodiments of the present disclosure, a plurality of icons may be provided and one or more of the plurality of icons may be movable floating icons. For example, when one floating icon is generated, the user may select a predetermined button (e.g., the "+" button on the icon 941 of FIG. 9), or may generate an additional icon indicating the analysis result through successive area selection operations using an input device such as an electronic pen. In this case, when the user selects the predetermined button ("+" button), the electronic device may be switched to the above-mentioned area selection state.

In various embodiments of the present disclosure, when the icon is selected, information included in the analysis result may pop up on the display. For example, in response to selection of the icon, analysis results (e.g., a place, a telephone number, a schedule, or the like) may be displayed on a lower portion of the display. However this is merely an example. For another example, when the icon is selected, the analysis results may be displayed on a right portion of the display (e.g., one third of the area of the display on the right side thereof). For example, when the icon is selected, the electronic device may display the analysis results 1331 to 1334 of FIG. 13 on a predetermined area of the display (e.g., the lower end area) or display the analysis results 1413 and 1415 of FIG. 14 on an arbitrary area of the display.

In various embodiments of the present disclosure, the analysis result may include analyzed information and an application or an execution menu related to the information. For example, in the case where the extracted text indicates a place or a place name, the electronic device may provide the analysis result including a map application. For example, in the case where the extracted text reads "Starbucks", a plurality of icons may be displayed based on information obtained through a search performed using "Starbucks" as a keyword. For example, the plurality of icons may include a map showing a STARBUCKS store located near a user device and a map application, a telephone number of the STARBUCKS store and an SMS/telephone application, an official application of STARBUCKS and an execution or installation menu, and a homepage address of STARBUCKS (e.g., www.istarbucks.co.kr) and a browser application. Examples related to this operation will be described with reference to FIG. 13 or 14.

Through the process described above with reference to FIG. 3, the user may be provided with information based on text extracted from the selection area. Furthermore, recommendable operations or operation cards may also be provided to the user so that the efficiency of information use of the user may be improved.

The operations described above with reference to FIG. 3 and various examples are described in detail below with reference to FIGS. 4 to 15.

Figure 4:
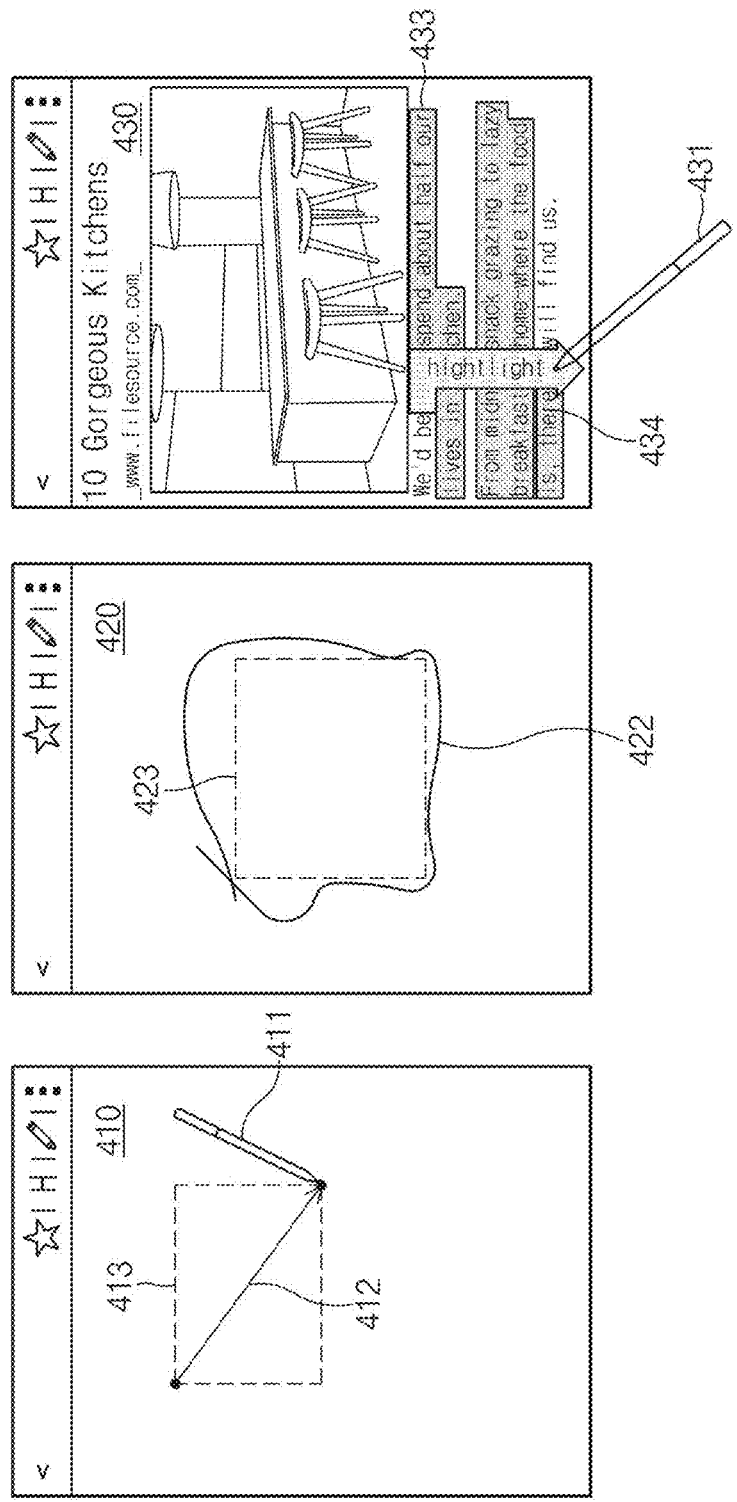
FIG. 4 illustrates a method for determining a selection area according to various embodiments of the present disclosure.

FIG. 4 illustrates a method for determining a selection area according to various embodiments of the present disclosure.

Referring to FIG. 4, a selection input from the user may be a touch-and-drag-type input that may be recognized as various curves or straight lines. For example, in a screen 410, the user may provide a linear input 412 that connects one point to another point using a stylus 411. Based on two points (e.g., a start point and an end point) corresponding to the input, the electronic device may determine a selection area 413. Selection area 413 may be a predetermined shape such as a quadrangle having a diagonal line connecting the two points as illustrated in FIG. 4. However, selection area may have any shape such as a circle having a diameter line connecting the two points, or the like. Although the selection input illustrated in FIG. 4 is a linear line, in various embodiments of the present disclosure, the selection input may be a free curve connecting one point to another point where the electronic device may recognize a start point and an end point of the curve and may determine a figure that connects the two points as the selection area.

In various embodiments of the present disclosure, the electronic device may determine an area inscribed in a closed curve associated with a selection input. For example, in a screen 420, the electronic device may determine a selection area to be a quadrangle 423 inscribed in a closed curve 422 formed by an input from the user. In various embodiments of the present disclosure, the quadrangle 423 may have a largest area among quadrangles that can be inscribed in the closed curve 422. In various embodiments of the present disclosure, the quadrangle 423 may have a ratio between width and height which most closely approximates to 1 among the quadrangles that can be inscribed in the closed curve 422. However, in various embodiments of the present disclosure, the electronic device may determine a shape different from a quadrangle circumscribed to the input closed curve as the selection area or may determine the input closed curve itself as the selection area.

In an exemplary embodiment, referring to FIG. 4, a selection input device 431 such as a stylus or pen may be used to highlight a portion of content displayed on screen 430. For example, selection input device 431 may have a starting input on a first line 433 of text and an ending input on another line 434 of text. The selection input device 431 may form a vertical line from the starting input and the ending input where the text associated with each line within the vertical line from the starting input to the ending input may be highlighted and thus selected by the selection input device 431.

In various embodiments of the present disclosure, even though the user input does not form a closed curve, the electronic device may determine the selection area based on the user input. For example, even though the user input starts from one point and ends at another point such that the selection area does not form a closed curve since the user has input the user input hurriedly or roughly, the electronic device may form a shortest virtual line connecting the one point to the other point and may determine a selection area to be inscribed in or circumscribed to a closed curve area defined by the user input where the virtual line is the selection area. According to such a selection area determining method, the selection area is able to be determined even though the user provides an input without being particularly accurate regarding the area selection, and the user may not experience inconvenience that may be caused by a message notifying the user of an inaccurate selection of an area or a request to provide an input again.

In various embodiments of the present disclosure, the selection area may be determined based on a user input that moves from a certain point on the display of the electronic device to the left or the right by a predetermined distance and then scrolls up or down. In this case, an area that is not output to an initially displayed screen but is shown by the scrolling may be added to an area selected by the user.

In various embodiments of the present disclosure, the electronic device may apply one or more of the above-mentioned selection area determining methods selectively or in combination. For example, the electronic device may determine which of the above-mentioned selection area determining methods, for example, method 1 using a start point and an end point, method 2 using an area inscribed in a user input, and method 3 using a scrolled area, that correspond to a user input based on an electronic pen or a user input based on a touch (input in the area selection state). For example, the electronic device may apply method 1 when it is determined that the user input has directivity corresponding to an arbitrary diagonal, or may apply method 2 when it is determined that the user input forms an inscribed area or is sufficient to form an inscribed area without having particular directivity, or may apply method 3 when it is determined that the user input moves horizontally by a certain distance and then moves vertically.

When the selection area is determined, the electronic device may determine an extraction method (e.g., operation 320) for extracting information associated with the selection area. The electronic device may determine different extraction methods according to the type of object included in the selection area. A method for determining the type of object included in the selection area is described below with reference to FIG. 5.

Figure 5:
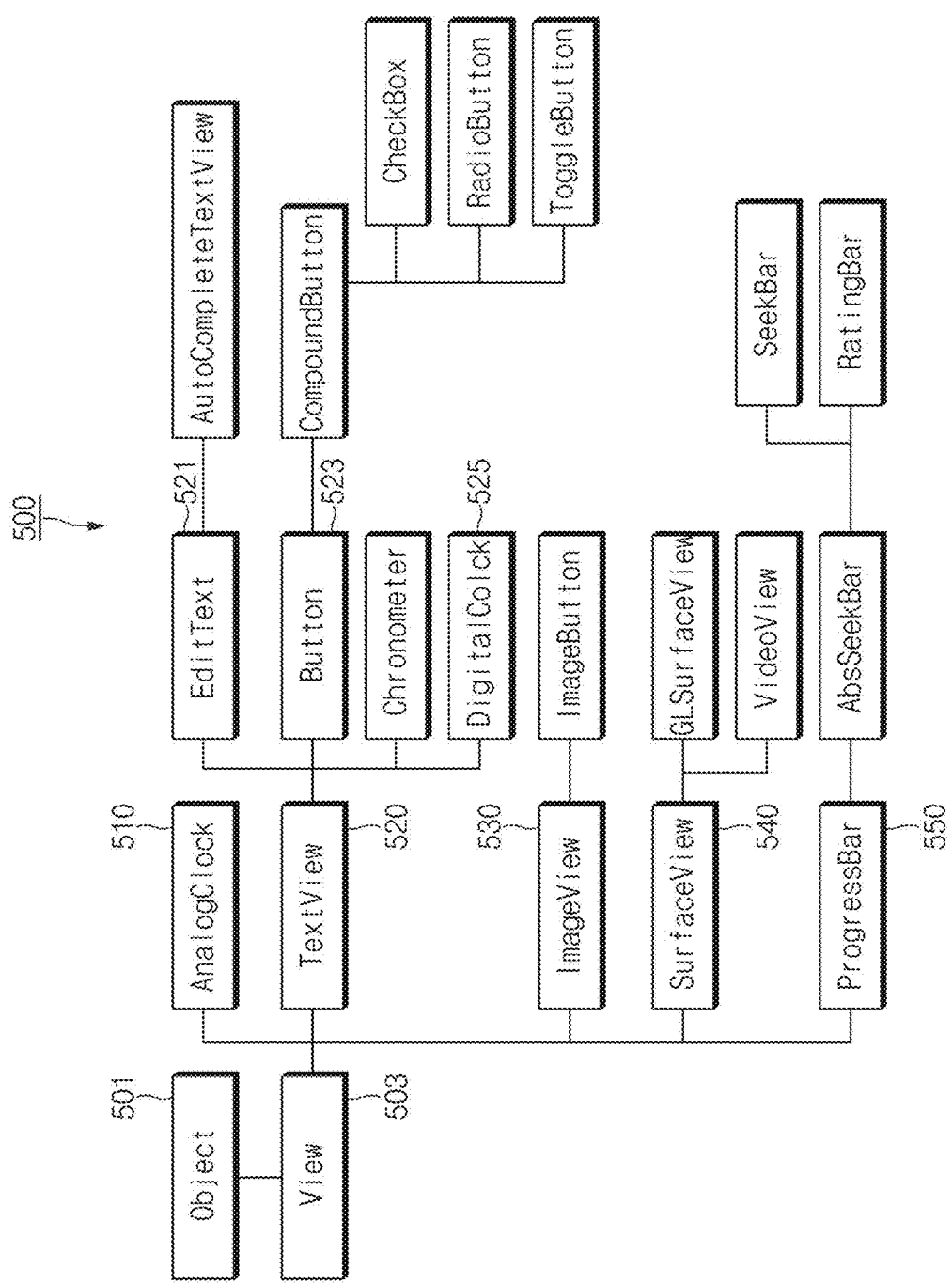
FIG. 5 illustrates a hierarchical structure of an object according to various embodiments of the present disclosure.

FIG. 5 illustrates a hierarchical structure of an object according to various embodiments of the present disclosure.

The embodiment illustrated in FIG. 5 may correspond to a view of ANDROID OS. However, this is merely an example. A hierarchical object for configuring a screen is used in various OSs such as WINDOWS, IOS, or TIZEN, and the hierarchical structure described herein may be applied to different OSs.

Referring to FIG. 5, an uppermost object 501 may include a view 503. The view 503 may include various objects corresponding to a lower layer. For example, the view 503 may include an AnalogClock 510, a TextView 520, an ImageView 530, a SurfaceView 540, and a ProgressBar 550. Furthermore, each object may include lower objects thereof. For example, the TextView 520 may include an object corresponding to an EditText 521, a Button 523, or a DigitalClock 525. Such objects may form a user interface directly displayed on the screen of the electronic device.

Among the above-mentioned objects, the TextView 520 relates to displaying of text on the display of the electronic device. The ImageView 530 may show an image. The EditText 521 corresponds to an object capable of receiving text. In various embodiments of the present disclosure, the TextView 520 and the lower objects thereof may correspond to an object having a text type. Other objects and lower objects thereof not corresponding thereto may correspond to an object not having a text type (having a non-text type). For example, the ImageView 530 and a lower object thereof may correspond to an object having an image type.

In various embodiments of the present disclosure, objects derived from one object may inherit an attribute of an upper object. The attribute of an object may include, for example, an identifier (ID) of the object, a width/length of the object, a background color of the object, an inner/outer padding/margin, or the like.

Although not illustrated in FIG. 5, a ViewGroup may be included in the View 503. The ViewGroup may also include various lower objects. For example, the ViewGroup may include objects such as FrameLayout, RelativeLayout, LinearLayout, and the like. Such objects may form a layout on which the above-mentioned objects included in the View 503 are displayed.

In various embodiments of the present disclosure, the electronic device may configure a layout displayed on the screen of the electronic device using the above-mentioned objects. These objects may have a hierarchical structure. When a specific area of the screen is determined as the selection area, the electronic device may determine an object corresponding to the selection area. In various embodiments of the present disclosure, the object corresponding to the selection area may represent an object entirely included in the selection area or an object of which at least a part is included in the selection area. In various embodiments of the present disclosure, the object corresponding to the selection area may represent an object, at least a certain proportion of an area of which is included in the selection area.

Examples of applying different extraction methods according to the type of an object included in the selection area are described below with reference to FIGS. 6 and 7.

Figure 6:
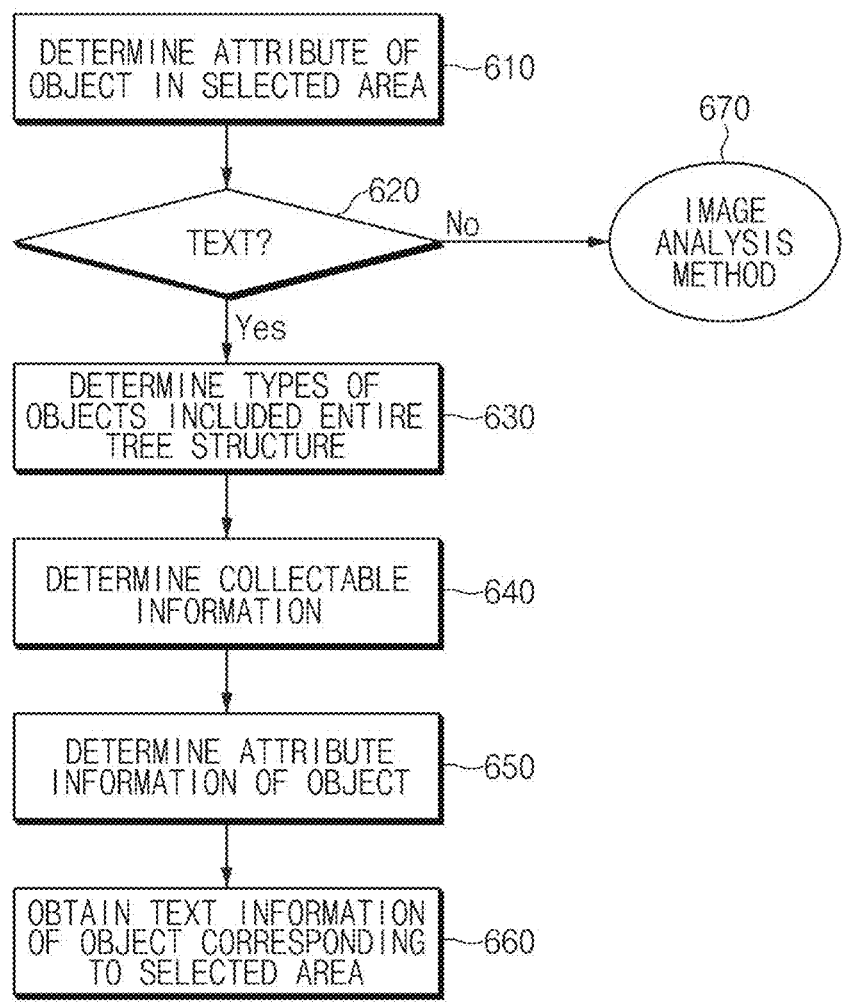
FIG. 6 illustrates a process of applying a text extraction method to a selection area according to various embodiments of the present disclosure.

FIG. 6 illustrates a process of applying a text extraction method to a selection area according to various embodiments of the present disclosure.

Referring to FIG. 6, in operation 610, the electronic device may determine an attribute of an object associated with the selected area. For example, the electronic device may determine the type of at least one object located within the selection area. Operation 610 may be performed by, for example, a parsing module.

In operation 620, the electronic device may determine whether the at least one object includes text (e.g., the TextView 520 or a lower object thereof). For example, in the case where the at least one object includes text, the electronic device may perform operation 630. In various embodiments of the present disclosure, in the case where the object does not include text or a portion of the at least one object includes both text and one or more non-text-type objects, or the at least one object includes one or more image-type objects, operation 630 may be performed on the text-type object identified in operation 620. Furthermore, an image analysis method of operation 670 may be performed on the one or more image-type objects. In various embodiments of the present disclosure, in operation 630, the electronic device may apply the image analysis method of operation 670 to the entirety of the selection area. Furthermore, all data may be processed in operation 670 according to the type of a selected object. The text extraction method (operations 630 to 660) is described with reference to FIG. 6, and the image analysis method is described with reference to FIG. 7.

In operation 630, the electronic device may determine the types of all objects included in a tree structure by analyzing the tree structure (or a hierarchical structure) of a window of a currently shown screen. For example, the electronic device may determine whether an arbitrary object has a text type (e.g., the TextView 520), an image type (e.g., the ImageView 530), or a layout type (e.g., the LinearLayout).

In operation 640, the electronic device may determine whether each object has collectable information. In the text extraction method, the electronic device may determine a text-type object as an object having collectable information. For example, an object such as the AnalogClock 510 representing a clock may not be determined as an object having collectable information. Furthermore, objects forming a layout may be determined as an object not having collectable information. In various embodiments of the present disclosure, objects such as the Button 523 or CheckBox may be determined as an object not having collectable information even if such objects are text-type objects. The type of objects that include collectable information may be predetermined.

In operation 650, the electronic device may determine attribute information of each object. This operation may be performed on an object determined as having collectable information in operation 640. In various embodiments of the present disclosure, each object may inherit an attribute of an upper object and the electronic device (e.g., a parsing module) may access all attributes of an object including not only text information of the object but also a color, a font, coordinates, a link, or the like thereof so as to obtain information on the attributes.

In operation 660, the electronic device may extract text information from at least one object corresponding to the selection area (e.g., the selection area determined in operation 310). In this case, the information on a text color, a font, a link obtained in operation 650 may be extracted together.

Figure 7:
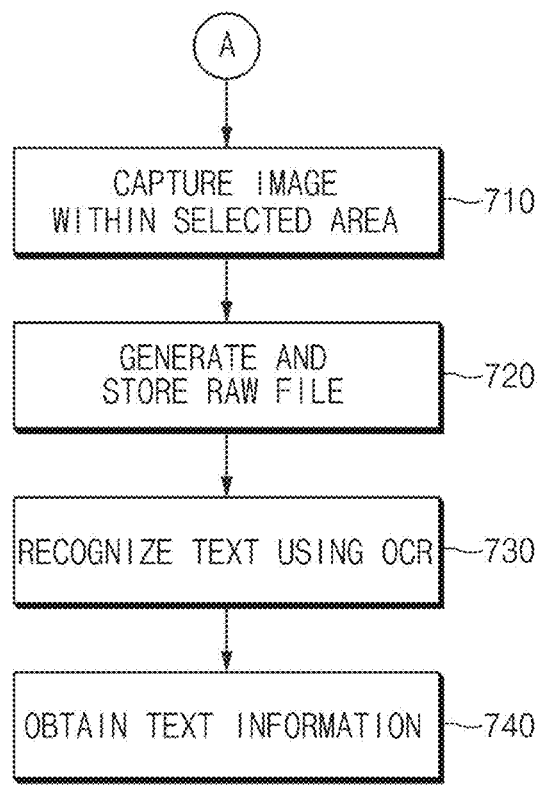
FIG. 7 illustrates a process of applying an image analysis method to a selection area according to various embodiments of the present disclosure.

FIG. 7 illustrates a process of applying an image analysis method to a selection area according to various embodiments of the present disclosure.

In the case where a portion or all of the at least one object within the selection area does not include text in operation 620 of FIG. 6, the process of FIG. 7 may be applied. Furthermore, as described above, both the image analysis method of FIG. 7 and the text extraction method of claim 6 may be performed. However, in the case of performing both the methods, an operation for removing overlapping extraction results may be performed. In various embodiments of the present disclosure, various operations prior to application of the image analysis method may be construed as operation A (e.g., operation 670 of FIG. 6 or an arbitrary operation prior thereto). Furthermore, in addition to a thread for performing the process of FIG. 6, the electronic device may generate a thread for performing the process of FIG. 7.

Referring to FIG. 7, in operation 710, the electronic device may perform image capturing within a selected area. In various embodiments of the present disclosure, the electronic device may perform image capturing within the selected area or may perform image capturing on an area including all of objects, at least a part of each of which is included in the selected area.

In operation 720, the electronic device may generate a raw image file from a captured selected area and may store the raw image file in a memory. In this case, the memory may be a buffer. Furthermore, the electronic device may store size information of the captured selected area in the raw image file in the form of a header.

In various embodiments of the present disclosure, a raw image may include data minimally processed by an image sensor. The data may be in a completely raw state. The raw image file may include only information on an intensity of light sensed by a photographing module (e.g., a camera) without having a determined white balance, parameter, color space, or the like. Regarding the format of the raw image file, the raw image file may have different extensions according to manufacturers. For example, SAMSUNG uses an image file extension of .srw, PANASONIC uses an image file extension of .rwa, and CANON uses an image file extension of .crw, .cr2, and .cr3.

In operation 730, the electronic device may recognize text included in the selected area by applying an OCR technique to the raw image file. For example, the electronic device may transfer the raw image file stored in the buffer to an OCR engine so as to perform text extraction. In this manner, the electronic device may extract text not only from a text-type object but also from an image-type object.

In operation 740, the electronic device may obtain, from the text recognized in operation 730, text information recognized from an image-type object. For example, the electronic device may compare the text information obtained in operation 660 with the text recognized in operation 730 so as to determine a text excluding overlapping text as text information obtained from an image-type object.

The process of FIG. 7 may bring about an improved effect compared to an existing OCR process. Text recognition based on a typical OCR technique is performed by transferring a captured image to an OCR engine through a process of bitmap compression and decompression of the captured image. For example, an electronic device generates an image file (through bitmap compression) of a captured area, stores the image file in a memory, processes (or decompresses) the file into a format recognizable by the OCR engine, and provides the processed file to the OCR engine. However, according to various embodiments of the present disclosure, the area is stored in the form of a raw image file in a buffer and then the raw image is transferred to the OCR engine such that an operation performance speed is improved since compression and decompression are skipped.

Figure 8:
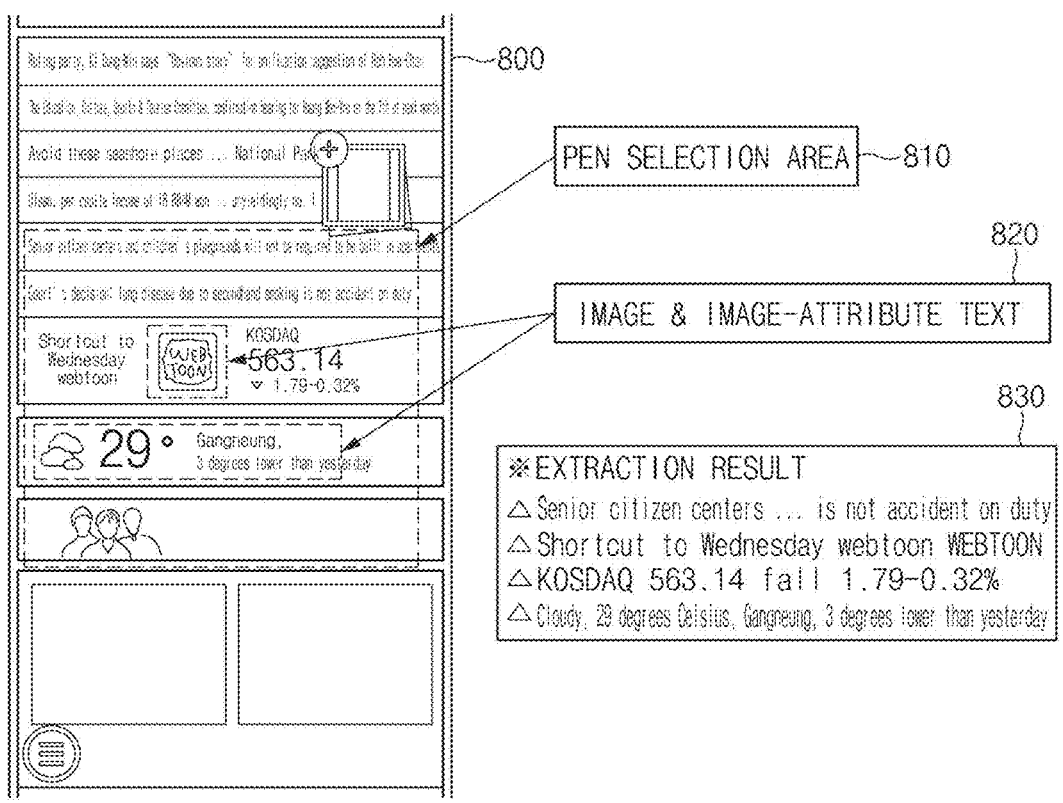
FIG. 8 illustrates a result of extraction from a selected area of a webpage including an object having an image attribute and a text attribute according to various embodiments of the present disclosure.

FIG. 8 illustrates a result of extraction from a selected area of a webpage including an object having an image attribute and a text attribute according to various embodiments of the present disclosure.

Referring to FIG. 8, a webpage 800 may be created in appropriate language such as hypertext markup language (HTML) or hypertext preprocessor (PHP). An electronic device accessing the webpage 800 may acquire the webpage 800 to analyze a source code thereof and may configure a screen of the electronic device. In various embodiments of the present disclosure, the electronic device 800 may configure the screen using objects such as those described above with reference to FIG. 5 in order to display the webpage 800.

A certain area 810 may be selected based on an input received through various input means. The area may include text and image/image-attribute text 820. Here, the image-attribute text may be construed as text in which a content attribute is an image but which enables a user to visually recognize text on the image. Alternatively, the image-attribute text may be construed as an image including text recognizable by an OCR engine.

In various embodiments of the present disclosure, texts such as "Senior citizen centers and children's playgrounds will not be required to be built in apartments", "Court's decision: lung disease due to secondhand smoking is not accident on duty", "Shortcut to Wednesday webtoon", and "KOSDAQ 563.14 ▼1.79-0.32%" may be extracted from the selected area 810 using the text extraction method of FIG. 6.

In various embodiments of the present disclosure, texts such as "WEBTOON", "cloudy", "29 degrees Celsius", and "Gangneung, 3 degrees lower than yesterday" may be extracted from the image 820 of the selected area 810 using the image analysis method of FIG. 7.

In the process of FIG. 6, the electronic device is able to obtain meta information including not only text information but also information on a link, color, font, or the like by searching all objects included in the entire tree structure of the window displayed on the screen. Therefore, the electronic device may obtain font information, link information, or the like together with a text. For example, hyperlink information of "Shortcut to Wednesday webtoon" may be obtained together.

In various embodiments of the present disclosure, a parsing module may perform semantic analysis on obtained information. For example, a symbol such as "▼" may be analyzed to have the meaning of "fall". Therefore, an extraction result 830 may include information such as "KOSDAQ 563.14 fall 1.79-0.32%". Furthermore, the parsing module may analyze the meaning of an image corresponding to a cloud in a weather portion of the image 820, so as to extract the word "cloudy". Accordingly, the extraction result 830 may include information such as "Cloudy, 29 degrees Celsius, Gangneung, 3 degrees lower than yesterday".

Figure 9:
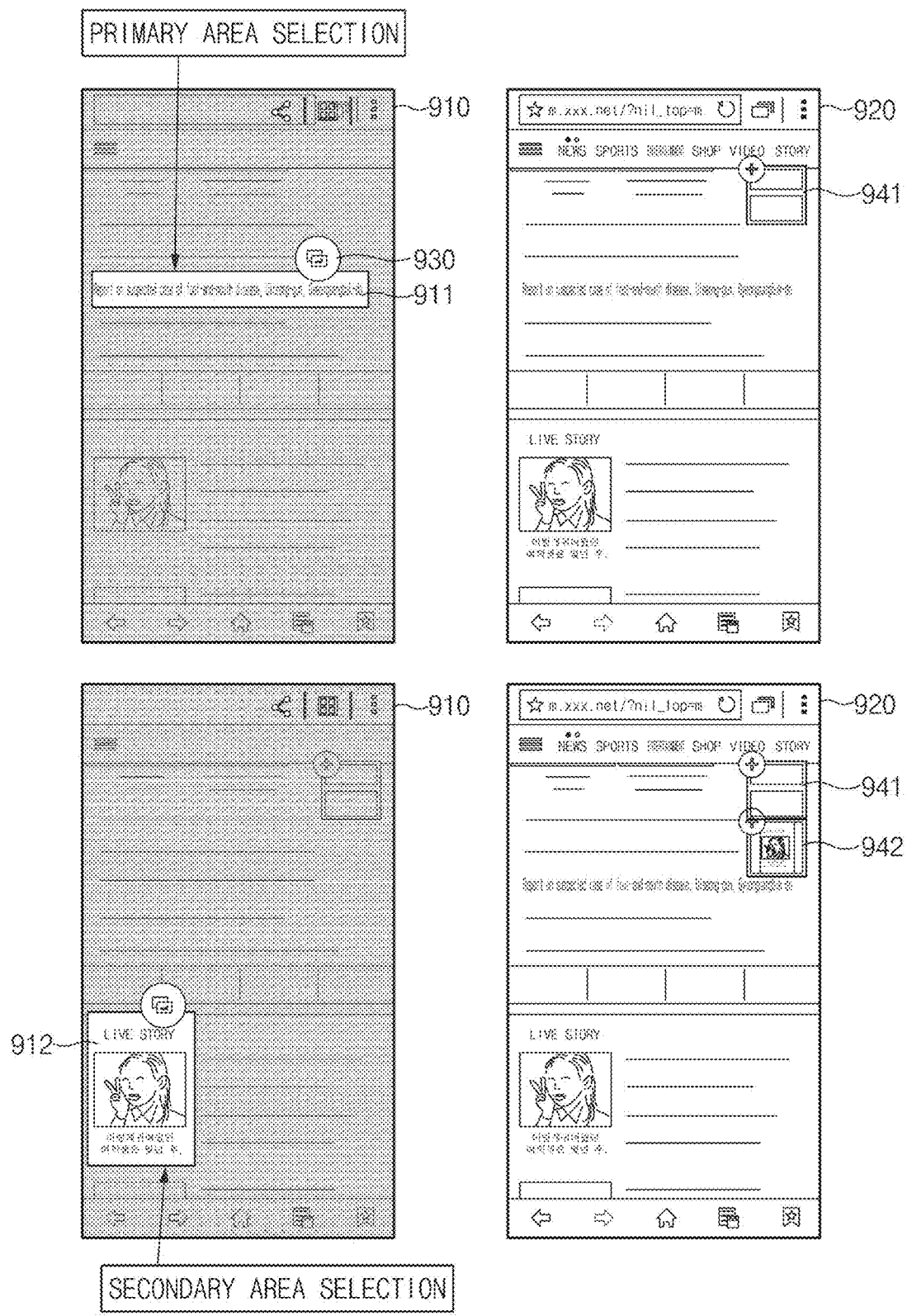
FIG. 9 illustrates a method for providing a result of analysis on a selected area according to various embodiments of the present disclosure.

FIG. 9 illustrates a method for providing a result of analysis on a selected area according to various embodiments of the present disclosure.

Referring to FIG. 9, while an input associated with an area selection is received, a screen 910 that includes the area selection may be adjusted. For example, after an input associated with selected area 911 of the screen 910 is received, screen 910 may be shaded except for selected area 911.

In various embodiments of the present disclosure, when the user discontinues selection of the area 911, icon 941 indicating a result of analysis on the selected area may be displayed on one portion of a screen 920 while the area selection state is released (or while the screen 910 returns to the normal screen 920 prior to the area selection). In an embodiment of the present disclosure, even though the selection of the area 911 is finished, the screen 910 may be maintained (e.g., shaded) until an icon 930 that requires interaction is selected. While the screen 910 is maintained, the user may adjust a size or a location of the selected area 911.

In various embodiments of the present disclosure, the electronic device may store the result of the analysis on the selected area in the form of a floating icon (e.g., the icon 941) on the display in addition to displaying the result of the analysis on the selected area on the display or performing a relevant function. As described above, a user experience (UX) scenario of an operation performed by the user with the electronic device may be continuously maintained without being broken. Although FIG. 9 illustrates that the floating icon 941 has a form of a captured area, the floating icon may have various forms. Furthermore, the floating icon 941 may be maintained on the screen even though a running application is changed. For example, instead of adding a view object to an application, a view object corresponding to the floating icon 941 may be generated in a service (continuously performed even though an application is terminated) and may be registered in a window manager (e.g., the window manager 342) or a view manager such that the floating icon 941 may be always on a top view.

In various embodiments of the present disclosure, when primary area 911 selection is finished, the user may perform an operation for selecting a secondary area 912 (for entering the area selection state) such as the "+" button of the icon 941. Then, when the user finishes selection of a secondary area 912, an icon 942 indicating a result of analysis on the secondary area 912 may be displayed on the screen 920 in the same manner as described above with respect to the selection of the primary area selection. In this manner, the user may continuously capture desired areas from one or more applications so as to obtain analysis information of the areas.

In the examples described above with reference to FIGS. 8 and 9, an extraction result may be differentiated from an analysis result. For example, the extraction result 830 of FIG. 8 may represent text extracted from the selected area 810. The analysis result of FIG. 9 may represent information obtained through analysis using an extraction result. For example, the electronic device may perform the above-mentioned analysis operation using an extracted text in relation to operation 330 of FIG. 3. For example, the text of "Uiseong-gun, Gyeongsangbuk-do" may be extracted from the area 911 of FIG. 9 and as a result of analysis using the text a geographical location, map information, population, transportation information, or the like associated with Uiseong-gun, Gyeongsangbuk-do may be obtained. In various embodiments of the present disclosure, in the case where the icon 941 of FIG. 9 is selected by the user, information obtained through analysis using an extraction result from the area 911 may be provided.

In various embodiments of the present disclosure, the user may obtain an analysis result using extraction results from a plurality of areas. This operation is described below with reference to FIG. 10.

Figure 10:
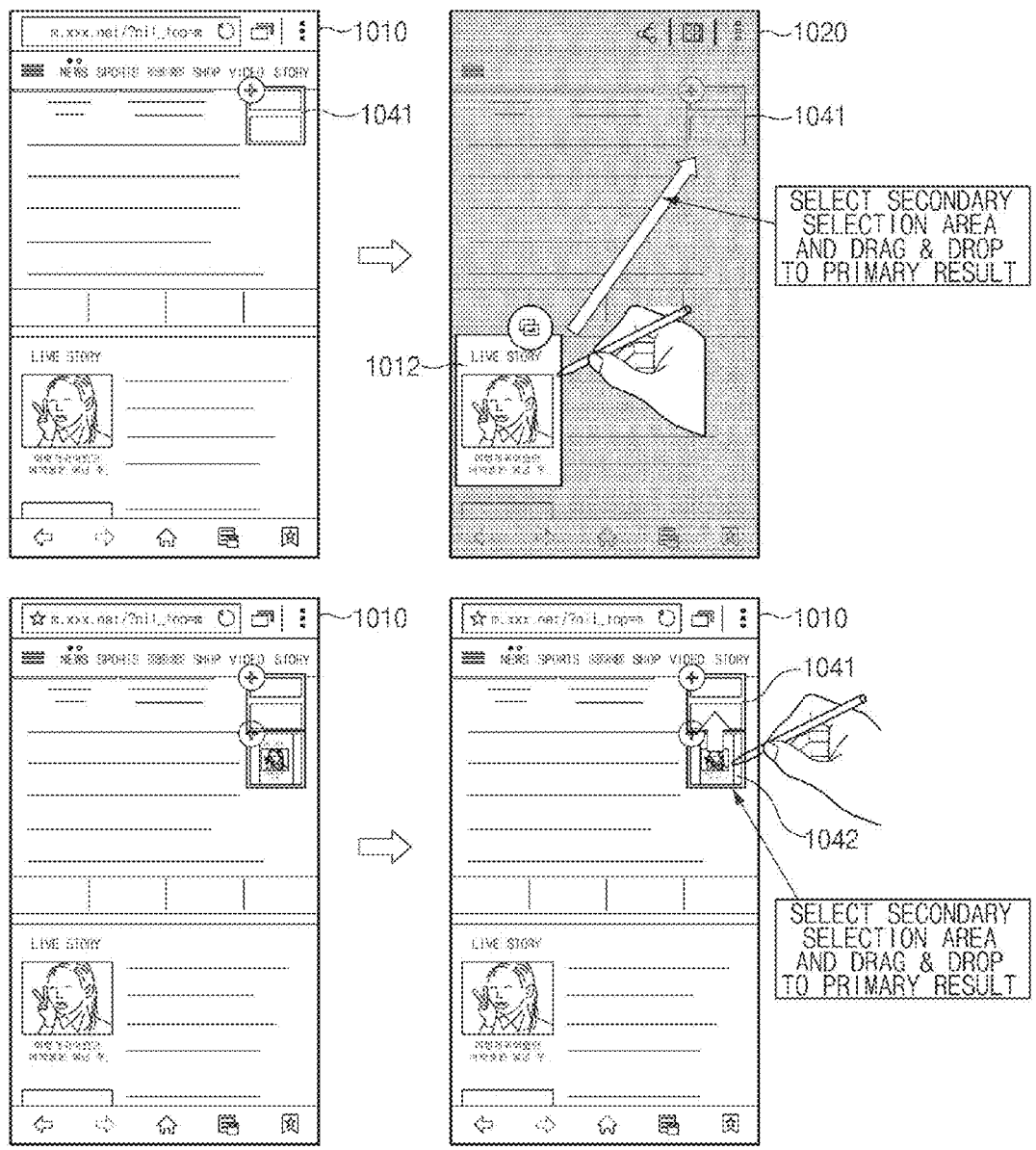
FIG. 10 illustrates a method for obtaining an analysis result from a plurality of selected areas according to various embodiments of the present disclosure.

FIG. 10 illustrates a method for obtaining an analysis result from a plurality of selected areas according to various embodiments of the present disclosure.

Referring to FIG. 10, an icon 1041 may indicate a result of analysis using an extraction result (e.g., a primary extraction result) obtained from a certain selected area of a screen 1010. Here, when the user selects a certain area 1012 of a screen 1020 and then drags the area 1012 to the icon 1041, the electronic device may perform text extraction (e.g., according to the extraction method of FIGS. 6 and/or 7) on the area 1012. The electronic device may analyze an extraction result from the area 1012 (e.g., a secondary extraction result) and the primary extraction result. When analysis is complete, the electronic device may change information to be provided when the icon 1041 is selected from information based on the primary extraction result to information based on the primary and secondary extraction results.

Through the example of FIG. 10, the user may obtain information based on different selected areas. For example, when the user selects an area including text related to "region", the electronic device may obtain a result of analysis performed using a corresponding region as a keyword and may store the result of analysis in a clipboard or the like. This analysis result may be displayed as a certain icon on the screen. When the user selects an area including text related to "weather" and drag-and-drops the area to the icon, the electronic device may obtain a result of analysis (e.g., today/tomorrow weather of the corresponding region) performed using "region" and "weather" as keywords and may match the result of analysis to the icon.

In various embodiments of the present disclosure, the electronic device may display a first icon 1041 indicating an analysis result based on a first area and a second icon 1042 indicating an analysis result based on a second area. When an input for drag-and-dropping the second icon 1042 to the first icon 1041 is received from the user, the electronic device may match an analysis result to the first icon 1041, the analysis result being obtained based on an extraction result from the first area and an extraction result from the second area. In this case, the second icon 1042 may disappear from the screen 1010.

Figure 11:
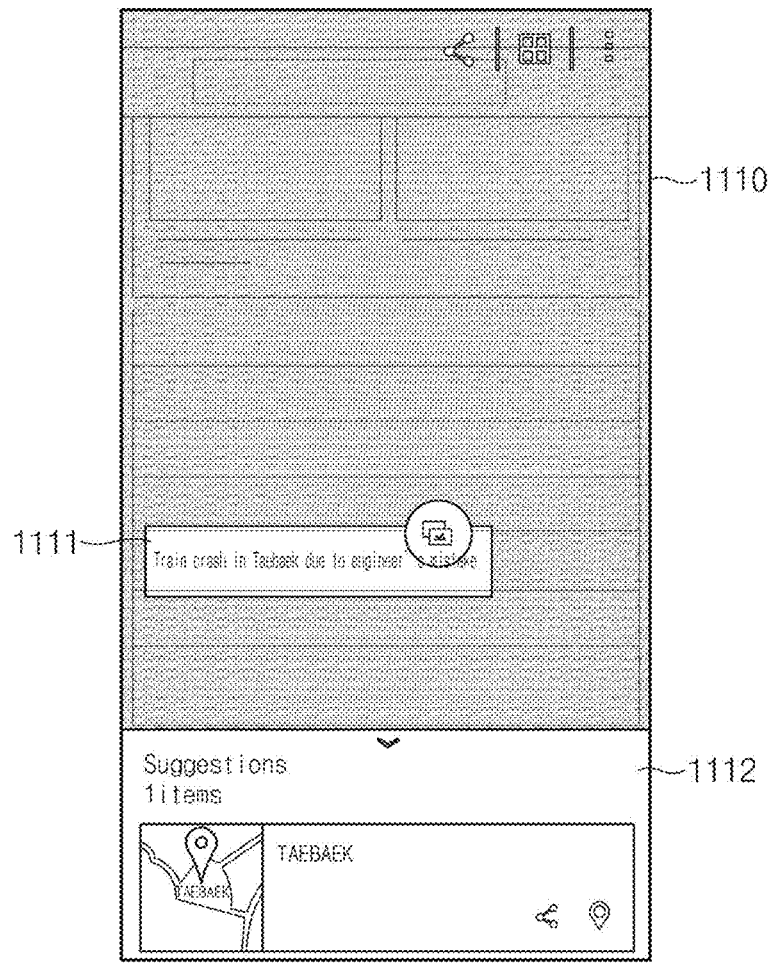
FIG. 11 illustrates a method for providing an analysis result according to various embodiments of the present disclosure.

FIG. 11 illustrates a method for providing an analysis result according to various embodiments of the present disclosure.

Referring to FIG. 11, a certain area 1111 may be selected by the user from a screen 1110. In this case, an area other than the area 1111 may be shaded.

The electronic device may perform operations 310 to 340 of FIG. 3 on the area 1111, and may display a result of the performance to an area 1112. For example, the area 1111 may include the text of "Train crash in Taebaek due to engineer's mistake". The electronic device may extract text from the area 1111 and may perform analysis (e.g., text token analysis, information acquisition through a search engine, or the like) using the extracted text (e.g., "Taebaek") as a keyword. As a result, for example, geographical information on Taebaek City may be included in an analysis result. Furthermore, the analysis result may include a menu for sharing this information or executing a map application in relation to this information. In an embodiment of the present disclosure, information provided in the area 1112 may be provided, for example, in the case where an icon (not shown) indicating a result of analysis based on text extracted from the area 1111 is selected.

In relation to the example of FIG. 10, area selection and analysis may be performed regardless of the type of a web browser provided by the electronic device. For example, various browsers such as GOOGLE CHROME, SAFARI, OPERA, FIREFOX, and INTERNET EXPLORER may be installed at the electronic device. According to an existing text information extraction method, text information may be unable to be accessed depending on the type of a web browser (e.g., GOOGLE CHROME) in some cases. However, according to various embodiments of the present disclosure, in the case where analysis on text within a corresponding area is unable to be performed, a selected area may be captured to undergo image analysis so that text analysis is allowed regardless of a browser (or regardless of whether access to text information is allowed).

Unlike the above-mentioned example, an existing electronic device may be able to extract text displayed on a screen using a typical OCR method, but is unable to extract meta information including information on a color, size, font, link, or the like of a text when the electronic device uses such a method even in the case where access to text information is allowed. Therefore, according to various embodiments of the present disclosure, even in the case of text extraction, an entire range of information accessible by an electronic device may be extracted.

Figure 12:
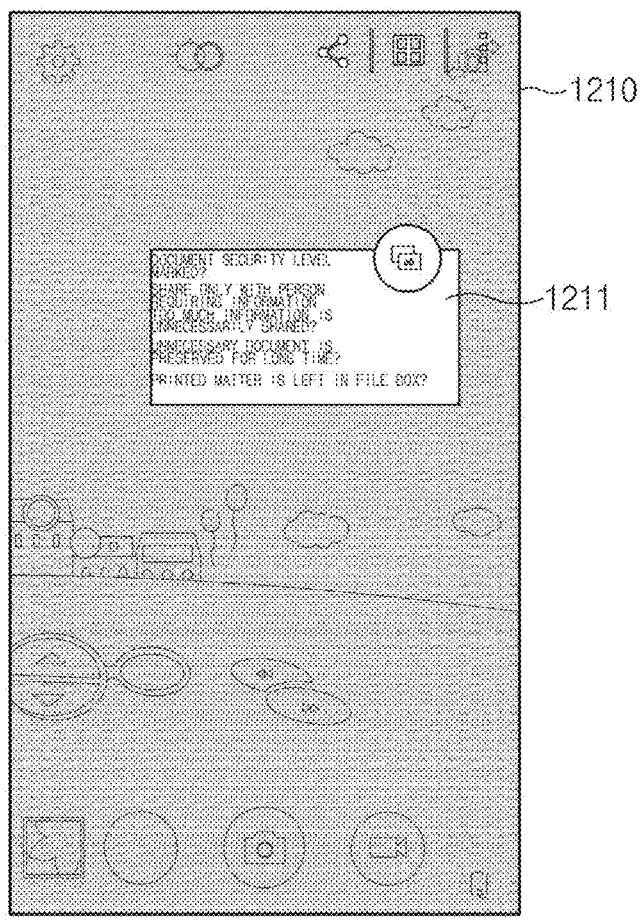
FIG. 12 illustrates a method for providing a result of analysis in a camera preview state according to various embodiments of the present disclosure.

FIG. 12 illustrates a method for providing a result of analysis in a camera preview state according to various embodiments of the present disclosure.

Referring to FIG. 12, the user may select a certain area using the above-mentioned various methods and input means even in the camera preview state. That is, according to various embodiments of the present disclosure, an analysis area (or a selected area) is determined using an input means, and information within the area (coordinates) is extracted and thus selection and analysis operations according to various embodiments of the present disclosure do not affect operation of a currently running application. Therefore, a certain area 1211 may be selected from a screen 1210 on which a camera preview is displayed as illustrated in FIG. 12. Text information within the area 1211 may be extracted such that a recommendation result based on a result of extraction may be provided. This method may improve user convenience since information is allowed to be used immediately in the preview state, in comparison with an existing method in which a subject to be analyzed is photographed, the shot image is read, and text is extracted therefrom through OCR in order to be used.

Figure 13:
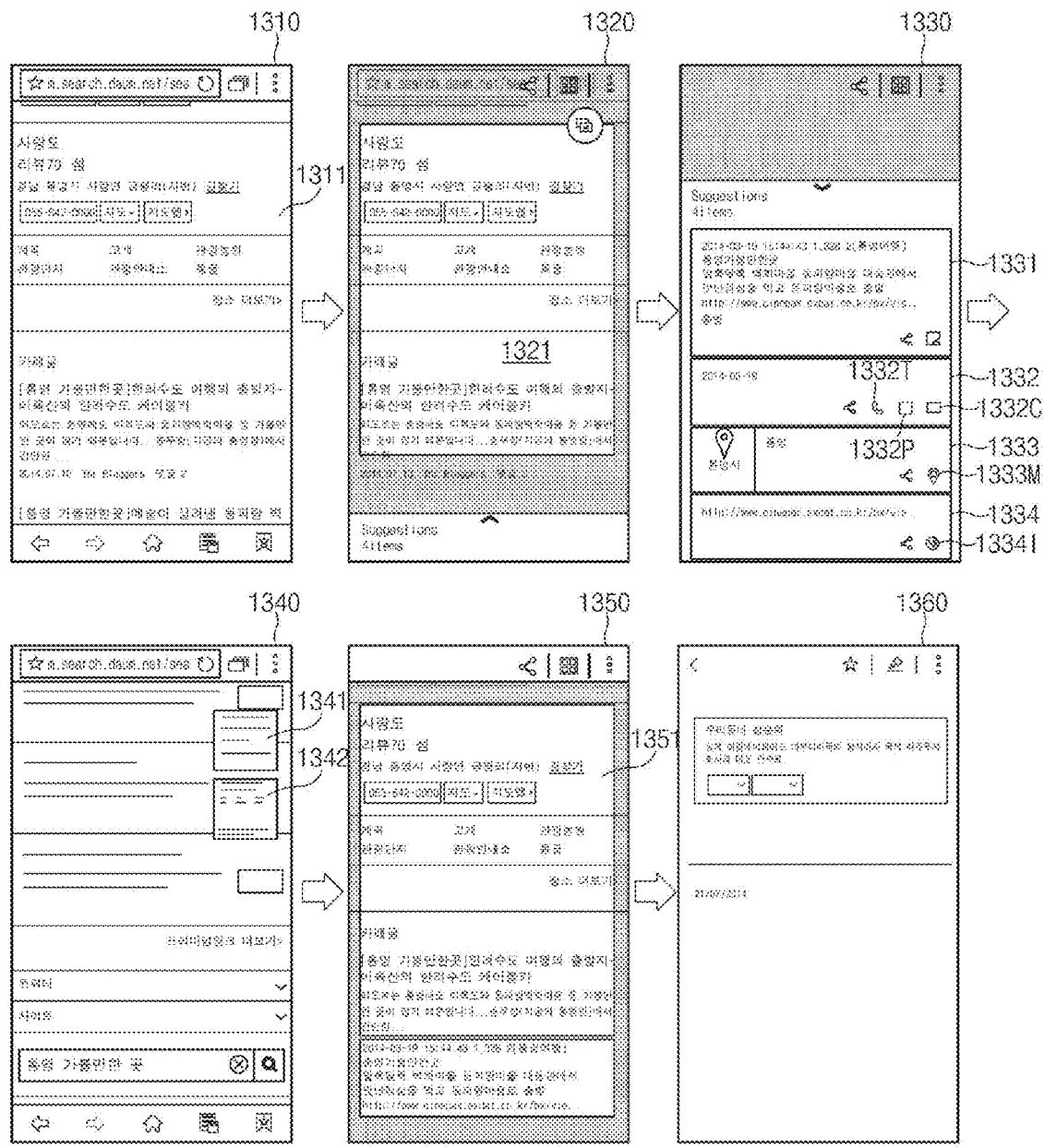
FIG. 13 illustrates a user interface (UI) according to various embodiments of the present disclosure.

FIG. 13 illustrates a UI according to various embodiments of the present disclosure.

Referring to FIG. 13, a screen 1310 represents a screen in which an area 1311 is selected by the user from content output to a display. When a selected area 1321 is determined using the method described above with reference to FIG. 4, the electronic device may extract text from the area 1321 and may provide an analysis result based on the extracted text. As illustrated in a screen 1320, the electronic device may provide a recommended operation for parsed information at a certain lower end area while showing a selected area. In various embodiments of the present disclosure, the recommended operation may be provided by an operation of selecting an icon indicating a result of analysis.

In various embodiments of the present disclosure, when the result of analysis (or the icon indicating the result of analysis) is selected, at least one analysis result may be provided together with specific information and an application/menu related to the specific information. For example, an analysis result 1331 may provide schedule information together with a calendar application, an analysis result 1332 may provide a date (number) information together with a telephone application icon 1332T, a schedule management application icon 1332P, and a contact number application icon 1332C. An analysis result 1333 may provide geographical information together with a map application icon 1333M, and an analysis result 1334 may provide link information together with a browser application icon 13341.

In the screen 1320, when a clipboard icon located at a right upper end of the selected area 1321 is selected, the selected area 1321 may be stored in a clipboard. An icon indicating the area stored in the clipboard may be displayed like an icon 1341 or an icon 1342 of a screen 1340. In various embodiments of the present disclosure, the icon indicating the area stored in the clipboard may be displayed differently from an icon indicating an analysis result.

In a screen 1350, the user may check content 1351 stored in the clipboard by selecting the icon 1341 or the icon 1342 displayed on screen 1340. Furthermore, as illustrated in a screen 1360, since information collected in the clipboard includes all pieces of information on an object (the type, attribute, or the like of an object), a button, a menu, or the like included in the collected information may operate normally.

Figure 14:
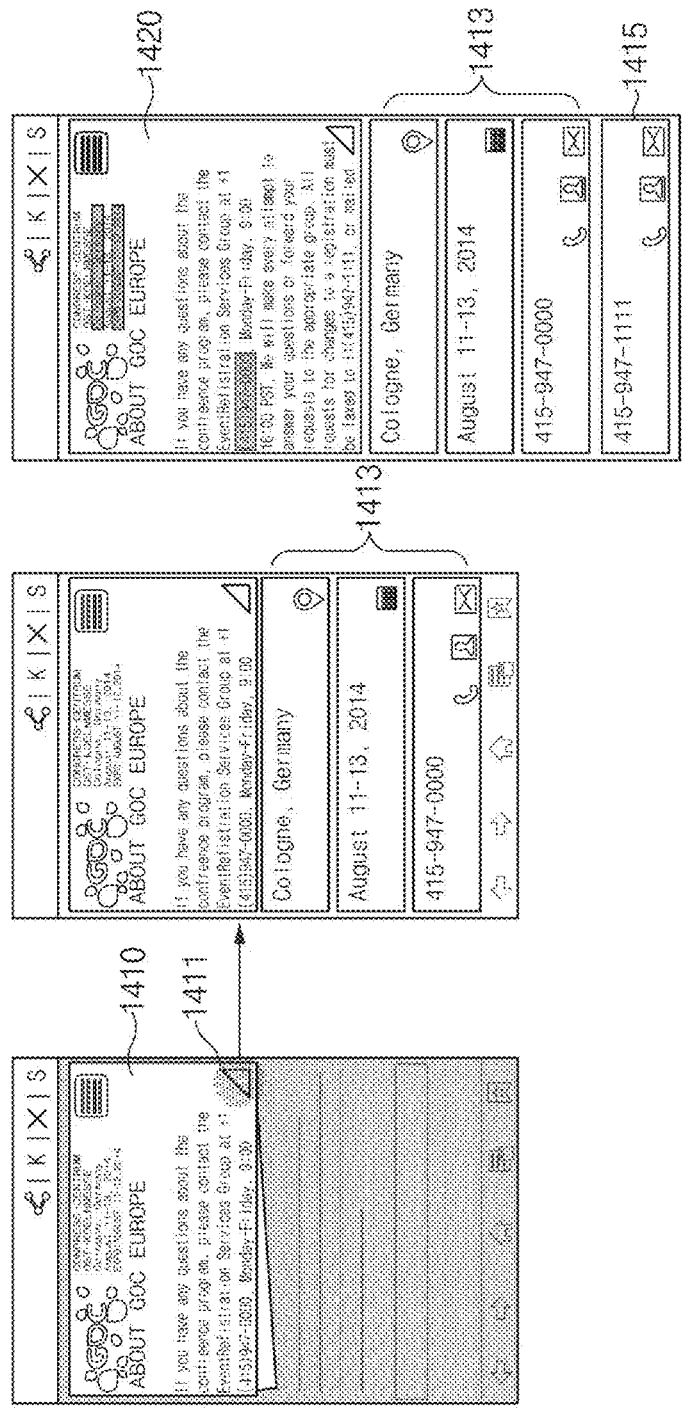
FIG. 14 illustrates an example of providing an analysis result in real time according to various embodiments of the present disclosure.

FIG. 14 illustrates an example of providing an analysis result in real time according to various embodiments of the present disclosure.

Referring to FIG. 14, a selected area 1410 may be determined. The electronic device may provide a mark 1411 at a portion of the selected area 1410, such as a right lower end thereof. In an exemplary embodiment, the mark 1411 may indicate that a size and/or location of the selected area 1410 are adjustable.

The electronic device may perform text extraction and analysis on the selected area 1410 and may provide an analysis result 1413 to a lower end area of the display of the electronic device. In this case, the selected area 1410 and the analysis result 1413 may be controlled so as not to overlap each other (e.g. using a scroll bar or the like).

When the user adjusts the selected area 1410 to a selected area 1420 using the mark 1411, the electronic device may provide analysis results 1413 and 1415 for the selected area 1420. In this case, the electronic device may newly perform analysis on the area 1420, or the electronic device may detect a different portion between the area 1410 and the area 1420 and then may perform analysis on the different portion alone so as to additionally provide an analysis result for the different portion (e.g., the analysis result 1415).

Figure 15:
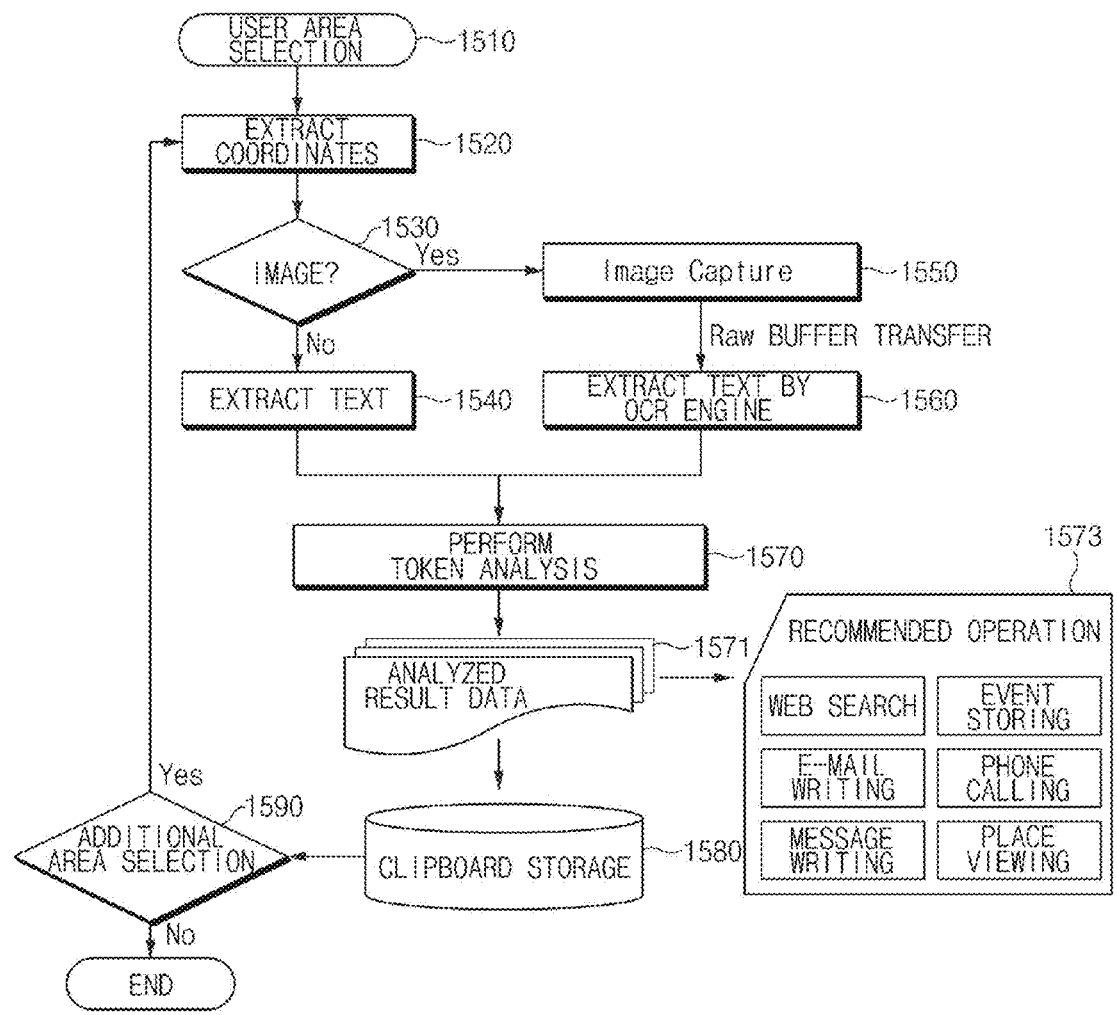
FIG. 15 illustrates a text extraction and analysis process according to various embodiments of the present disclosure.

FIG. 15 illustrates a text extraction and analysis process according to various embodiments of the present disclosure.

Referring to FIG. 15, in operation 1510, a certain area may be selected by the user. In operation 1520, the electronic device may determine an area selected by the user and may extract coordinates of the determined area.

In operation 1530, the electronic device may determine whether an area corresponding to the coordinates determined in operation 1520 corresponds to an image. If the area is not an image, the process may proceed to operation 1540 so that text extraction may be performed. This operation may correspond to the text extraction method described above with reference to FIG. 6. When the area is an image, the electronic device may perform image capturing on the area to generate a raw file and may transfer the file to an OCR engine through a buffer in operation 1550. In operation 1560, the electronic device may extract text from the image using the OCR engine. This operation may correspond to the image analysis method described above with reference to FIG. 7.

The embodiment of FIG. 15 may be construed as an example in which different analysis methods are used according to whether an area selected by a user corresponds to text or an image, among the above-mentioned various examples. Such an analysis method may be performed for an execution screen of a message application, an e-mail application, a gallery application, or the like which highly possibly includes text or an image alone rather than an execution screen of a browser application in which text is embedded within an image.

In operation 1570, the electronic device may perform token analysis (e.g., Hermes service token analysis) using the text extracted in operation 1540 or 1560. However, this is merely an example, and thus the above-mentioned various analysis methods may be applied. Analysis result data 1571 may be stored in a clipboard (operation 1580), or may be used to form a recommended operation 1573. The recommended operation 1573 may include various operations such as web navigation (browser application), event storing (calendar application), e-mail writing (e-mail application), phone calling (telephone application), message writing (message application), or place viewing (map application). In the case where at least one recommended operation 1573 is matched to the analysis result data 1571, a recommended operation (application or menu) may be provided together with an analysis result.

In operation 1590, the electronic device determines whether an additional area selection operation is performed by the user. When an additional area selection input occurs, the process may proceed to operation 1520, otherwise the process may end.

An information providing method according to various embodiments of the present disclosure may include determining a selected area based on a user input, determining an extraction method based on the types of one or more objects included in the selected area, extracting information from the selected area according to the determined extraction method, and performing a specific function based on the information. The method may further include analyzing the extracted information and displaying a result of the analysis on a display of an electronic device.

In various embodiments of the present disclosure, the determining of the selected area may include determining a quadrangle area having a diagonal that connects a start point of the user input and an end point thereof as the selected area, determining a quadrangle area inscribed in a closed curve formed by the user input as the selected area, or determining a drag area formed by a horizontal input and a vertical input in the user input as the selected area. Furthermore, in various embodiments of the present disclosure, the determining of the selected area may include receiving an input for switching an electronic device into a selection mode and determining the selected area based on the user input that occurs after the input is received. In this case, the method may further include releasing the selection mode if the user input is finished.

In various embodiments of the present disclosure, the determining of the extraction method may include determining the types of the one or more objects corresponding to the selected area and determining the extraction method as a text extraction method when all of the types of the objects are text types or as the text extraction method or an image analysis method when at least a portion of attributes of the objects is not the text type.

In various embodiments of the present disclosure, the text extraction method may include analyzing a tree structure including the one or more objects, collecting the type and attribute of each object included in the tree structure, and extracting text information from the one or more objects corresponding to the selected area among each object. Furthermore, the text extraction method may include extracting at least one of a text color, font, or link together with the text information.

In various embodiments of the present disclosure, the image analysis method may include capturing the selected area in a format of an image and extracting text recognized from a captured image using an OCR technique. Furthermore, the capturing may include capturing the image and storing the image in a format of a raw image file in a buffer by configuring size information of the captured information in a header.

In various embodiments of the present disclosure, the extracting of the information may include adding, to an extraction result, information obtained using text extracted from the selected area as a keyword or adding, to the extraction result, information obtained by comparing the text extracted from the selected area with a DB located inside or outside an electronic device.

In various embodiments of the present disclosure, the displaying of the result of the analysis may include displaying an icon indicating the result of the analysis to one portion of the display. Furthermore, the displaying of the result of the analysis may include displaying information included in the result of the analysis to a specified area of the display when the icon is selected. Furthermore, the displaying of the result of the analysis may include providing the information included in the result of the analysis together with an application related to the information.

Figure 16:
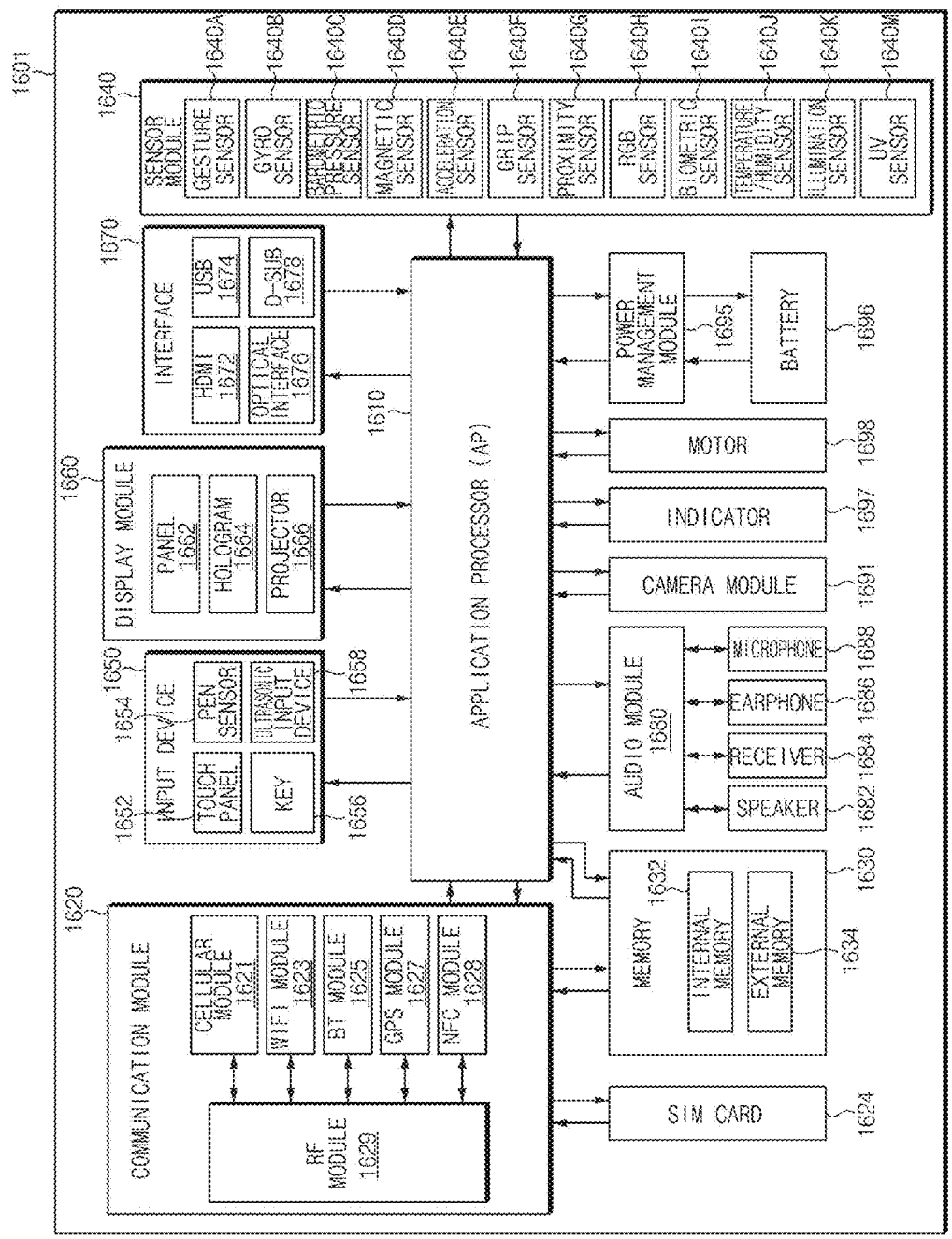
FIG. 16 is a block diagram illustrating an electronic device according to various embodiments of the present disclosure.

FIG. 16 is a block diagram illustrating an electronic device 1601 according to various embodiments of the present disclosure.

Referring to FIG. 16, the electronic device 1601 may include, for example, a part or the entirety of the electronic device 101 illustrated in FIG. 1. The electronic device 1601 may include at least one AP 1610, a communication module 1620, a subscriber identification module (SIM) card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 may run an OS or an application program so as to control a plurality of hardware or software elements connected to the AP 1610 and may process various data and may perform an operation thereon. The AP 1610 may be implemented with, for example, a system on chip (SoC). According to an embodiment of the present disclosure, the AP 1610 may further include a graphics processing unit (GPU) and/or an image signal processor. The AP 1610 may include at least a portion (e.g., the cellular module 1621) of the elements illustrated in FIG. 16. The AP 1610 may load, on a volatile memory, an instruction or data received from at least one of other elements (e.g., a nonvolatile memory) to process the instruction or data, and may store various data in a nonvolatile memory.

The communication module 1620 may have a configuration that is the same as or similar to that of the communication interface 170 of FIG. 1. The communication module 1620 may include, for example, a cellular module 1621, a Wi-Fi module 1623, a BT module 1625, a GPS module 1627, a near field communication (NFC) module 1628, and a radio frequency (RF) module 1629.

The cellular module 1621 may provide, for example, a voice call service, a video call service, a text message service, or an Internet service through a communication network. According to an embodiment of the present disclosure, the cellular module 1621 may identify and authenticate the electronic device 1601 in the communication network using a subscriber identification module (e.g., the SIM card 1624). According to an embodiment of the present disclosure, the cellular module 1621 may perform at least a part of functions provided by the AP 1610. According to an embodiment of the present disclosure, the cellular module 1621 may include a CP.

Each of the Wi-Fi module 1623, the BT module 1625, the GPS module 1627, and the NFC module 1628 may include, for example, a processor for processing data transmitted/received through the modules. According to various embodiments of the present disclosure, at least a part (e.g., two or more) of the cellular module 1621, the Wi-Fi module 1623, the BT module 1625, the GPS module 1627, and the NFC module 1628 may be included in a single integrated chip (IC) or IC package.

The RF module 1629 may transmit/receive, for example, communication signals (e.g., RF signals). The RF module 1629 may include, for example, a transceiver, a power amp module (PAM), a frequency filter, a low noise amplifier (LNA), an antenna, or the like. According to an embodiment of the present disclosure, at least one of the cellular module 1621, the Wi-Fi module 1623, the BT module 1625, the GPS module 1627, or the NFC module 1628 may transmit/receive RF signals through a separate RF module.

The SIM card 1624 may include, for example, an embedded SIM and/or a card including a user identification module, and may include unique identification information (e.g., an integrated circuit card identifier (ICCID)) or subscriber information (e.g., international mobile subscriber identity (IMSI)).

The memory 1630 (e.g., the memory 130) may include an internal memory 1632 or an external memory 1634. The internal memory 1632 may include at least one of a volatile memory (e.g., a dynamic random access memory (DRAM), a static RAM (SRAM), a synchronous DRAM (SDRAM), or the like) or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid state drive (SSD)).

The external memory 1634 may include a flash drive, for example, compact flash (CF), secure digital (SD), micro-SD, mini-SD, extreme digital (xD), a memory stick, or the like. The external memory 1634 may be functionally and/or physically connected to the electronic device 1601 through various interfaces.

The sensor module 1640 may, for example, measure physical quantity or detect an operation state of the electronic device 1601 so as to convert measured or detected information into an electrical signal. The sensor module 1640 may include, for example, at least one of a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor 1640H (e.g., a red/green/blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1640 may further include a control circuit for controlling at least one sensor included therein. In various embodiments of the present disclosure, the electronic device 1601 may further include a processor configured to control the sensor module 1640 as a part of the AP 1610 or separately, so that the sensor module 1640 is controlled while the AP 1610 is in a sleep state.

The input device 1650 may include, for example, a touch panel 1652, a (digital) pen sensor 1654, a key 1656, or an ultrasonic input device 1658. The touch panel 1652 may employ at least one of capacitive, resistive, infrared, and ultraviolet sensing methods. The touch panel 1652 may further include a control circuit. The touch panel 1652 may further include a tactile layer so as to provide tactile reaction to a user.

The (digital) pen sensor 1654 may include, for example, a sheet for recognition which is a part of a touch panel or is separate therefrom. The key 1656 may include, for example, a physical button, an optical button, or a keypad. The ultrasonic input device 1658, which employs an input tool for generating an ultrasonic signal, may enable the electronic device 1601 to sense a sound wave through a microphone (e.g., a microphone 1688) so as to identify data.

The display 1660 (e.g., the display 160) may include a panel 1662, a hologram device 1664, or a projector 1666. The panel 1662 may have a configuration that is the same as or similar to that of the display 160 of FIG. 1. The panel 1662 may be, for example, flexible, transparent, or wearable. The panel 1662 and the touch panel 1652 may be integrated into a single module. The hologram device 1664 may display a stereoscopic image in a space using a light interference phenomenon. The projector 1666 may project light onto a screen so as to display an image. The screen may be disposed in the inside or the outside of the electronic device 1601. According to an embodiment of the present disclosure, the display 1660 may further include a control circuit for controlling the panel 1662, the hologram device 1664, or the projector 1666.

The interface 1670 may include, for example, an HDMI 1672, a USB 1674, an optical interface 1676, or a D-sub-miniature (D-sub) 1678. The interface 1670 may be included in the communication interface 170 illustrated in FIG. 1. Additionally or alternatively, the interface 1670 may include, for example, a mobile high-definition link (MHL) interface, an SD card/multi-media card (MMC) interface, or an infrared data association (IrDA) interface.

The audio module 1680 may convert, for example, a sound into an electrical signal or vice versa. At least a part of elements of the audio module 1680 may be included in the input/output interface 150 illustrated in FIG. 1. The audio module 1680 may process sound information input or output through a speaker 1682, a receiver 1684, an earphone 1686, or the microphone 1688.

The camera module 1691 is, for example, a device for shooting a still image or a video. According to an embodiment of the present disclosure, the camera module 1691 may include at least one image sensor (e.g., a front sensor or a rear sensor), a lens, an image signal processor (ISP), or a flash (e.g., an LED or a xenon lamp).

The power management module 1695 may manage, for example, power of the electronic device 1601. According to an embodiment of the present disclosure, the power management module 1695 may include a power management IC (PMIC), a charger IC, or a battery or fuel gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the AP 1610), such as a booting state, a message state, a charging state, or the like. The motor 1698 may convert an electrical signal into a mechanical vibration, and may generate a vibration or haptic effect. Although not illustrated, a processing device (e.g., a GPU) for supporting a mobile TV may be included in the electronic device 1601. The processing device for supporting a mobile TV may process media data according to the standards of digital multimedia broadcasting (DMB), digital video broadcasting (DVB), or MEDIAFLO.

Each of the above-mentioned elements of the electronic device may be configured with one or more components, and the names of the elements may be changed according to the type of the electronic device. In various embodiments of the present disclosure, the electronic device may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

An electronic device according to various embodiments of the present disclosure may include an area determination module configured to determine an area selected by a user, a parsing module configured to extract information from the selected area according to an extraction method determined based on the types of one or more objects included in the selected area, and a control module configured to perform a specific function based on the extracted information.

In various embodiments of the present disclosure, the parsing module captures the selected area and stores, in a buffer, the captured area in a format of a raw image if at least a portion of the types of the one or more objects is not a text type, and the electronic device may further include an OCR module for recognizing a text from the image stored in the buffer. Furthermore, the image stored in the buffer may include size information of the selected area in a file header.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a programming module. In the case where the instructions are performed by a processor (e.g., the processor 120), the processor may perform functions corresponding to the instructions. For example, the instructions may instruct the processor to perform determining a selected area based on a user input, determining an extraction method based on the types of one or more objects included in the selected area, extracting text information from the selected area according to the determined extraction method to analyze the text information, and outputting a result of the analyzing to a display of an electronic device. The computer-readable storage medium may be, for example, the memory 130.

The computer-readable recording medium may include a hard disk, a floppy disk, a magnetic medium (e.g., a magnetic tape), an optical medium (e.g., compact disc ROM (CD-ROM), DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa. For example, a recording medium includes computer-readable instructions, wherein the instructions may instruct an electronic device to perform determining a selected area based on a user input, determining an extraction method based on the types of one or more objects included in the selected area, extracting information from the selected area according to the determined extraction method, and performing a specific function based on the information. The recording medium may additionally include instructions for performing the above-mentioned various methods or operations.

The module or program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, information may be extracted using various methods according to the type of content displayed on an electronic device.

Furthermore, since an information providing method according to various embodiments of the present disclosure does not affect operation of a currently running application, information output to a display may be used without being limited to the type of a running application.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An information providing method of an electronic device, the information providing method comprising:
   determining a selected area of content displayed on a display of the electronic device based on a user input;
   determining an extraction method based on types of one or more objects included in the selected area;
   extracting information from the selected area according to the determined extraction method; and
   performing a specific function based on the information,
   wherein the determining of the extraction method comprises:
      determining the types of the one or more objects corresponding to the selected area,
      determining the extraction method as a text extraction method when all of the types of the objects included in the selected area are text types, and
      determining the extraction method as an image analysis method when at least a portion of types of the objects is not the text type, and
   wherein the extracting of the information according to the determined extraction method further comprises:
      performing a semantic extraction method if the one or more objects are a type to have a meaning associated therewith; and
      displaying the extracted information and information associated with the meaning of the one or more objects.

2. The method of claim 1, further comprising:
   analyzing the extracted information, and
   displaying a result of the analyzing to a display of the electronic device.

3. The method of claim 1, wherein the determining of the selected area comprises determining a quadrangle area having a diagonal that connects a start point of the user input and an end point thereof as the selected area.

4. The method of claim 1, wherein the determining of the selected area comprises determining a quadrangle area inscribed in a closed curve formed by the user input as the selected area.

5. The method of claim 1, wherein the determining of the selected area comprises determining a drag area formed by a horizontal input and a vertical input in the user input as the selected area.

6. The method of claim 1, wherein the determining of the selected area comprises:
   receiving an input for switching the electronic device into a selection mode; and
   determining the selected area based on the user input that occurs after the input for switching the electronic device into a selection mode is received.

7. The method of claim 1, wherein the text extraction method comprises:
analyzing a tree structure comprising the one or more objects;
collecting the type and an attribute of each object included in the tree structure; and
extracting text information from the one or more objects corresponding to the selected area among each object.

8. The method of claim 7, wherein the text extraction method further comprises extracting at least one of a text color, font, or link together with the text information.

9. The method of claim 1, wherein the image analysis method comprises:
capturing the selected area in a format of an image; and
extracting text recognized from the captured image using an optical character recognition (OCR) technique.

10. The method of claim 9, wherein the capturing of the selected area comprises:
capturing the image; and
storing the image in a format of a raw image file in a buffer by configuring size information of the captured information in a header.

11. The method of claim 1, wherein the extracting of the information comprises adding to an extraction result information obtained using text extracted from the selected area as a keyword.

12. The method of claim 1, wherein the extracting of the information comprises adding to an extraction result information obtained by comparing text extracted from the selected area with a database (DB) located inside or outside the electronic device.

13. The method of claim 2, wherein the displaying of the result of the analyzing comprises displaying an icon indicating the result of the analyzing on a portion of the display.

14. The method of claim 13, wherein the displaying of the result of the analyzing comprises displaying information included in the result of the analyzing to a specified area of the display when the icon is selected.

15. The method of claim 14, wherein the displaying of the result of the analyzing comprises providing the information included in the result of the analyzing together with an application related to the information.

16. An electronic device comprising:
a memory; and
at least one processor coupled to the memory and configured to:
determine an area selected by a user,
extract information from the selected area according to an extraction method determined based on types of one or more objects included in the selected area, and
perform a specific function based on the extracted information,
wherein the at least one processor is further configured to:
determine the types of the one or more objects corresponding to the selected area,
determine the extraction method as a text extraction method when all of the types of the objects included in the selected area are text types, and
determine the extraction method as an image analysis method when at least a portion of types of the objects is not the text type, and
wherein the at least one processor further configured to:
perform a semantic extraction method if the one or more objects are a type to have a meaning associated therewith; and
displaying the extracted information and information associated with the meaning of the one or more objects.

17. The electronic device of claim 16,
wherein the at least one processor is further configured to:
capture the selected area, and
store, in a buffer, the captured area in a format of a raw image when at least a portion of the types of the one or more objects is not a text type, and
wherein the memory is further configured to store an optical character recognition (OCR) program executable by the at least one processor for recognizing text from the image stored in the buffer.

18. The electronic device of claim 17, wherein the image stored in the buffer comprises size information of the selected area in a file header.

19. A non-transitory recording medium comprising computer-readable instructions that instruct an electronic device to perform:
determining a selected area of content displayed on a display of the electronic device based on a user input;
determining an extraction method based on types of one or more objects included in the selected area;
extracting information from the selected area according to the determined extraction method; and
performing a specific function based on the information,
wherein the determining of the extraction method comprises:
determining the types of the one or more objects corresponding to the selected area,
determining the extraction method as a text extraction method when all of the types of the objects included in the selected area are text types, and
determining the extraction method as an image analysis method when at least a portion of types of the objects is not the text type, and
wherein the extracting of the information according to the determined extraction method further comprises:
performing a semantic extraction method if the one or more objects are a type to have a meaning associated therewith; and
displaying the extracted information and information associated with the meaning of the one or more objects.

* * * * *